US007269151B2

(12) United States Patent  
Diener et al.

(10) Patent No.: US 7,269,151 B2
(45) Date of Patent: Sep. 11, 2007

(54) SYSTEM AND METHOD FOR SPECTRUM MANAGEMENT OF A SHARED FREQUENCY BAND

(75) Inventors: Neil R. Diener, Rockville, MD (US); Karl A. Miller, Frederick, MD (US)

(73) Assignee: Cognio, Inc., Germantown, MD (US)

( * ) Notice: Subject to any disclaimer, the term of this patent is extended or adjusted under 35 U.S.C. 154(b) by 1079 days.

(21) Appl. No.: 10/246,363

(22) Filed: Sep. 18, 2002

(65) Prior Publication Data

US 2003/0198200 A1     Oct. 23, 2003

Related U.S. Application Data

(60) Provisional application No. 60/319,542, filed on Sep. 11, 2002, provisional application No. 60/380,891, filed on May 16, 2002, provisional application No. 60/374,363, filed on Apr. 22, 2002.

(51) Int. Cl.
*H04Q 7/00* (2006.01)

(52) U.S. Cl. ...................................... 370/329

(58) Field of Classification Search ...................... None
See application file for complete search history.

(56) References Cited

U.S. PATENT DOCUMENTS

| | | | |
|---|---|---|---|
| 3,812,291 A | 5/1974 | Brodes et al. | 704/253 |
| 4,597,107 A | 6/1986 | Ready et al. | 455/226.1 |
| 5,093,927 A | 3/1992 | Shanley | 455/513 |
| 5,142,691 A | 8/1992 | Freeburg | 455/63.3 |
| 5,144,642 A | 9/1992 | Weinberg et al. | 375/10 |
| 5,276,908 A | 1/1994 | Koohgoli et al. | 455/34.1 |

(Continued)

FOREIGN PATENT DOCUMENTS

CA        2 298 316 A1     8/2000

(Continued)

OTHER PUBLICATIONS

McFarland et al., "5-GHz Unified Protocol (5-UP) Proposal, OFDM Extensions for 802.11a," Doc. IEEE 802.11-00/175, Jul. 2000.

(Continued)

*Primary Examiner*—Frank Duong
(74) *Attorney, Agent, or Firm*—Edell, Shapiro & Finnan, LLC

(57) ABSTRACT

A system and method for managing the spectrum utilization of a frequency band that is shared, both in frequency and time, by multiple devices. At one or more devices operating in the frequency band, pulses associated with signals occurring in the frequency band are detected by sampling part or all the frequency band for a time interval. From the detected signal pulses, the signals can be classified. In addition, overall spectrum activity can be measured. Using classification information for signals detected in the frequency band, policies can be executed so that a device may take certain actions in order to avoid interfering with other signals, or to optimize simultaneous use of the frequency band with the other signals. Signal detection occurs at one or more devices operating in a frequency band. Signal classification and measurement, as well as policy execution may occur within a processor of the same device where signal detection occurs, or in another device (located remotely or within the operating region of the frequency band).

26 Claims, 23 Drawing Sheets

U.S. PATENT DOCUMENTS

| | | | |
|---|---|---|---|
| 5,303,262 A | 4/1994 | Johnson | |
| 5,355,522 A | 10/1994 | Demange | 455/62 |
| 5,428,819 A | 6/1995 | Wang et al. | |
| 5,446,370 A | 8/1995 | Voight | |
| 5,574,979 A * | 11/1996 | West | 455/63.1 |
| 5,608,727 A | 3/1997 | Perreault et al. | |
| 5,610,839 A | 3/1997 | Karolak et al. | |
| 5,636,140 A | 6/1997 | Lee et al. | |
| 5,655,217 A | 8/1997 | Lemson | |
| 5,687,163 A | 11/1997 | Fox et al. | 370/207 |
| 5,732,077 A | 3/1998 | Whitehead | |
| 5,745,777 A | 4/1998 | English et al. | 375/228 |
| 5,752,164 A | 5/1998 | Jones | |
| 5,809,427 A | 9/1998 | Perreault et al. | |
| 5,850,596 A | 12/1998 | Reynolds | |
| 5,864,541 A | 1/1999 | Abu-Amara et al. | |
| 5,889,772 A | 3/1999 | Fischer et al. | |
| 5,907,812 A | 5/1999 | Van De Berg | 455/461 |
| 6,031,833 A | 2/2000 | Fickes et al. | |
| 6,141,565 A | 10/2000 | Feuerstein et al. | |
| 6,169,728 B1 | 1/2001 | Perreault et al. | |
| 6,229,799 B1 | 5/2001 | Caillerie et al. | |
| 6,240,282 B1 | 5/2001 | Kleider et al. | 455/226.1 |
| 6,240,372 B1 | 5/2001 | Gross et al. | 702/71 |
| 6,256,478 B1 | 7/2001 | Allen | |
| 6,275,695 B1 | 8/2001 | Obhan | |
| 6,282,408 B1 * | 8/2001 | Jang | 455/67.13 |
| 6,295,461 B1 | 9/2001 | Palmer et al. | |
| 6,307,839 B1 | 10/2001 | Gerszberg et al. | |
| 6,317,599 B1 | 11/2001 | Rappaport et al. | |
| 6,332,076 B1 | 12/2001 | Shah et al. | 455/423 |
| 6,349,198 B1 | 2/2002 | Carlson et al. | 455/63.1 |
| 6,336,780 B1 | 4/2002 | Obhan | |
| 6,374,082 B1 | 4/2002 | Carlson | |
| 6,442,507 B1 | 8/2002 | Skidmore et al. | |
| 6,466,614 B1 | 10/2002 | Smith | 375/224 |
| 6,499,006 B1 | 12/2002 | Rappaport et al. | |
| 6,690,769 B2 * | 2/2004 | Haines | 379/22.02 |
| 6,711,134 B1 | 3/2004 | Wichelman et al. | |
| 6,714,605 B2 | 3/2004 | Sugar et al. | |
| 6,850,735 B2 | 2/2005 | Sugar et al. | |
| 7,035,593 B2 | 4/2006 | Miller et al. | |
| 7,039,017 B2 * | 5/2006 | Sherlock | 370/252 |
| 7,116,943 B2 | 10/2006 | Sugar et al. | |
| 2001/0008837 A1 | 7/2001 | Takahashi | |
| 2001/0055952 A1 | 12/2001 | Ficarra | |
| 2002/0006799 A1 | 1/2002 | Rappaport et al. | |
| 2002/0019214 A1 | 2/2002 | Brown et al. | 455/67.11 |
| 2002/0077787 A1 | 6/2002 | Rappaport et al. | |
| 2002/0085503 A1 | 7/2002 | Hulyalkar et al. | |
| 2002/0086641 A1 | 7/2002 | Howard | 455/67.1 |
| 2002/0111772 A1 | 8/2002 | Skidmore et al. | |
| 2002/0142744 A1 | 10/2002 | Okanoue et al. | 455/226.1 |
| 2002/0154614 A1 | 10/2002 | Jagger et al. | 375/332 |
| 2002/0155811 A1 | 10/2002 | Prismantas et al. | 455/226.1 |
| 2002/0173272 A1 | 11/2002 | Liang et al. | 455/63 |
| 2002/0177446 A1 | 11/2002 | Bugeja et al. | 455/450 |
| 2003/0050012 A1 | 3/2003 | Black et al. | 455/62 |
| 2004/0023674 A1 | 2/2004 | Miller | |
| 2004/0028003 A1 | 2/2004 | Diener et al. | |
| 2004/0028123 A1 | 2/2004 | Sugar et al. | |
| 2004/0047324 A1 | 3/2004 | Diener | |
| 2004/0137915 A1 | 7/2004 | Diener et al. | |
| 2004/0156440 A1 | 8/2004 | Sugar et al. | |
| 2005/0002473 A1 | 1/2005 | Kloper et al. | |
| 2005/0227625 A1 | 10/2005 | Diener | |

FOREIGN PATENT DOCUMENTS

| | | |
|---|---|---|
| EP | 1 096 730 A | 5/2001 |
| JP | 2000-022712 | 1/2000 |
| WO | WO 03/028313 A2 | 4/2003 |

OTHER PUBLICATIONS

McGarvey, "Wi-Fi Moves Into Management Stage," Jul. 19, 2002, 80211planet.com.

New Product: CiscoWorks Wireless LAN Solution Engine Software Version 1.0, Product Overview, Key Features and Benefits, Specifications, Jul. 13, 2002.

"A Practical Approach to Identifying and Tracking Unauthorized 802.11 Cards and Access Points," Interlink Networks, 2002.

AiroPeek and Wireless Security: *Identifying and Locating Roque Access Points*, WildPackets, Inc., 2002.

"Verifying Bluetooth™ Baseband Signals Using Mixed-Signal Oscilloscopes," Aqilent Technologies, Inc., 2001.

"Oscor 5000 (Omni-Spectral Correlator)," date unknown.

Howitt et al., "Coexistence in the 2.4 GHz ISM Band," date unknown.

"Using Signal Processing to Analyze Wireless Data Traffic," BBN Technical Memorandum No. 1321, Job No. 1264054, May 22, 2002.

Report: Second Meeting of FCC Technological Advisory Council II, Nov. 28, 2001, pp. 1-27.

Jon M. Peha, "Wireless Communications and Coexistence for Smart Environments," IEEE Personal Communications, Oct. 2000, pp. 6-8.

Satapathy et al., "A Novel Co-existence Algorithm for Unlicensed Variable Power Devices," IEEE International Conference on Communications, Jun. 2001.

Monks et al., "A Power Controlled Multiple Access Protocol for Wireless Packet Networks," IEEE Infocom, Apr. 2001, pp. 219-228.

Vaduvur Bharghavan, "Performance Evaluation of Algorithms for Wireless Medium Access," IEEE International Computer Performance and Dependability Symposium IPDS'98, 1998, pp. 142-149.

Jon M. Peha, "Spectrum Management Policy Options," IEEE Communication Surveys, Fourth Quarter 1998, vol. 1, No. 1, pp. 2-8.

Charles L. Jackson, "Distributed Channel Assignment: The Tragedy of the Commons, Oblers's Paradox, and Mad Cow Disease," BWU ECE Colloguium, Mar. 30, 2001, slides 1-56.

Wireless Campus Working Group, "Position Paper on WLAN Radio Frequency Issues," Net@EDU, NET0014, Mar. 11, 2001, pp. 1-5.

Werbach, "Open Spectrum: The Paradise of the Commons," Edventure, Ester Dyson's Monthly Report, vol. 19, No. 10, Nov. 20, 2001, pp. 1-30.

Rodriques, "On the Design and Capacity Planning of a Wireless Location Area Network," NOMS'2000—VII IEEE/IFIP Network Operations and Management Symposium, Apr. 2000, pp. 335-348.

Satapathy et al., "Spectrum Sharing Without Licenses: Opportunities and Dangers," Proceedings of the Telecommunications Policy Research Conference (TPRC), 1996, pp. 1-19.

Masood, "Interference Characterization in Unlicensed National Information Infrastructure (U-NII) Band," Dept. of Systems & Computer Engineering, Carlton University, Sep. 26, 2000, pp. 1-27.

Yang et al., "On the Use of Unlicensed Frequency Spectrum, Use Rule Evolution, and Interference Mitigation," Adaptive Broadband, Jan. 18, 2001, pp. 1-12.

Mitola, III, "Cognitive Radio: An Integrated Agent Architecture for Software Defined Radio," Dissertation, Doctor of Technology, Joseph Mitola, III, Royal Institute of Technology, Sweden, May 8, 2000, pp. 1-294.

Satapathy et al., Etiquette Modification for Unlicensed Spectrum: Approach and Impact, Proceedings for IEEE Vehicular Technology Conference, vol. 1, May 1998, pp. 272-276.

Hendricks, "Is there Party 15 Congestion, Part I," FCC TAC, Jun. 28, 2000.

Hendricks, "Is there Party 15 Congestion, Part II," FCC TAC, Sep. 27, 2000.

Pettersson, "Performance and Implementation Aspects of Wireless Indoor Communication Systems with Local Centralization," A dissertation submitted to the Royal Institute of Technology, Sweden, Radio Communication Systems Laboratory, Dept. of Signals, Sensor and Systems, Apr. 2000, pp. 1-80.

Qiu et al., "Network-Assisted Resource Management for Wireless Data Networks," IEEE Journal on Selected Areas in Communications, vol. 19, No. 7, Jul. 2001, pp. 1222-1234.

Stamatelos et al., "Spectral Efficiency and Optimal Base Placement for Indoor Wireless Networks," IEEE Journal on Selected Areas in Communications, vol. 14, No. 4, May 1996, pp. 651-661.

Garces et al., "An Access Etiquette for Very-Wide Wireless Bands," Proceedings of the 7th International Conference on Computer Communications and Networks (IC3N'98), Oct. 1998.

K. Kontson, "In Pursuit of a Wireless Device Bill of Rights," Spectrum Management Working Group, FCC-TAC, Sep. 18, 2002, pp. 1-15.

Garces, Rodrigo et al., "Collision Avoidance and Resolution Multiple Access for Multichannel Wireless Networks", 1997, IEEE Infocom.

FCC Technological Advisory Council, "Report: First Meetting of FCC Technological Advisory Council II", Aug. 26, 2001.

Aegis Systems Limited, "Excerpt From Aegis Systems Limited: Chapter C Technical Factors Affecting Spectrum", unknown publication date.

Mobilian Corporation, "WI-FI™ (802.11b) and Bluetooth™: An Examination of Coexistence Approaches", Mobilian Corporation, 2001.

ISCO International, "Interference Solutions: Improve Performance Realize New Traffic", CDG Technology Forum, Oct. 1, 2002.

Medav, "Medav OC-6040: PC-Based 4-Channel Analyser and Demodulator for Narrowband Comint Signals With Automatic Signal Recognition, and Text Decoding Capability", Medav, 2002, 8 pages.

Boudreau et al., "Monitoring of the Radio Frequency Spectrum With a Digital Analysis System", Proceedings of the 15th International Wroclaw Symposium and Exhibition on Electromagnetic Compatibility, Jun. 27-30, 2000, Wroclaw, Poland.

Tektronix, "NETTEK® BTS Transmitter and Interference Analyzer", YBT250, Wireless Field Test, 2003.

Myles A. et al, "IEE 802. 11h Potential Draft Text D2.0" IEEE P802.11 Wireless Lans, Mar. 2002.

Mitola, Joseph III: "Cognitive Radio, An Integrated Agent Architecture for Software Defined Radio" May 8, 2000, Royal Institute of Technology.

XP 0022 92 635, IEE P802.11, Wireless LANs, Potential Draft Text, Mar. 2002.

European Search Report dated Feb. 14, 2006.

* cited by examiner

FIG. 20

| Last Scan: 8:02:11:57 | | | | | Num Samples: 3257 | | |
|---|---|---|---|---|---|---|---|
| Bin | 0 | 1 | 2 | 3 | 4 | 5 | 6 | 7 |
| Cycle | 20 | 35 | 35 | 35 | 35 | 35 | 35 | 35 |
| Max Pwr | -90 | -80 | -75 | -74 | -75 | -64 | -73 | -74 |
| Avg Pwr | -96 | -86 | -81 | -80 | -82 | -81 | -80 | -79 |
| Netwk (+ stats) | | 802.11 CH 1 | Tx-load = 8 | Rx-load = 7 | Back off = 3 | Rexmit = 2 | | |
| | | | | | | | | |
| Bin | 8 | 9 | 10 | 11 | 12 | 13 | 14 | 15 |
| Cycle | 35 | 35 | 35 | 35 | 35 | 35 | 35 | 25 |
| Max Pwr | -76 | -72 | -75 | -70 | -68 | -74 | -80 | -87 |
| Avg Pwr | -81 | -80 | -82 | -79 | -80 | -81 | -85 | -95 |
| Netwk (+ stats) | | | | | | | 802.11 CH 1 | |
| | ... | | | | | | | |

SYSTEM AND METHOD FOR SPECTRUM MANAGEMENT OF A SHARED FREQUENCY BAND

This application claims priority to the following applications (the entirety of all of which are incorporated herein by reference):

U.S. Provisional Application No. 60/374,363, filed Apr. 22, 2002.

U.S. Provisional Application No. 60/380,891, filed May 16, 2002.

U.S. Provisional Application No. 60/319,542, filed Sep. 11, 2002.

RELATED APPLICATIONS

This application is related to each of the following commonly assigned U.S. Non-Provisional applications, filed on even date (the entirety of both of which is incorporated herein by reference):

U.S. application Ser. No. 10/246,364, entitled "System and Method for Classification of Unknown Signals in a Frequency Band."

U.S. application Ser. No. 10/246,365, entitled "System and Method for Real-Time Spectrum Analysis in a Communication Device."

BACKGROUND OF THE INVENTION

Wireless local area networks (WLANs) operate in frequency spectrum that is unlicensed by the governing authority in most countries and jurisdictions. This frequency spectrum is commonly referred to as the "unlicensed band." In the United States, the unlicensed band established by the FCC consists of large portions of spectrum (e.g., 80 MHz @ 2.4 GHz, 300 MHz @ 5 GHz) which are free to use. The FCC currently sets minimal requirements for the unlicensed bands such as limits on transmit power spectral density and limits on antenna gain.

There are challenges to using the unlicensed band. Like the early days of the personal computer, current unlicensed band products are difficult to use and suffer from such problems as complex and costly installation, only manually configurable, interference with other devices, and limited diagnostics. Examples of communication protocols designed to use the unlicensed band are the IEEE 802.11x family of protocols, the Bluetooth™ protocol and cordless phone technologies. In addition, similar to the early days of cellular telephony, current unlicensed band products do not come close to the capacity and quality of service (QoS) that is achievable. The devices have little or no intelligence, the channels are fixed for a device as well as power levels, and the data rates, range of QoS are therefore limited.

Market projections indicate that technologies and use of the unlicensed band will grow significantly. A result of such growth is that as more and more devices use the unlicensed band, the spectrum will become more crowded, which in turn will degrade the quality of service in the unlicensed band. Thus, technology is needed to exploit all of the benefits of the unlicensed band without degrading the level of service that users expect.

Other objects and advantages of the present invention will become more readily apparent when reference is made to the following description in conjunction with the accompanying drawings.

SUMMARY OF THE INVENTION

Briefly, a system and method are provided for managing the spectrum utilization of a frequency band that is shared, both in frequency and time, by multiple devices. An example of such a frequency band is an unlicensed frequency band, examples of which are described hereinafter. At one or more devices operating in the frequency band, pulses associated with signals occurring in the frequency band are detected by sampling part or the entire frequency band for a time interval. From the detected signal pulses, the signals can be classified. In addition, overall spectrum activity can be measured. Using classification information for signals detected in the frequency band, policies are executed so that a device may take certain actions in order to avoid interfering with other signals, or to optimize simultaneous use of the frequency band with the other signals. Signal classification and measurement, as well as policy execution may occur within a processor of the same device where signal detection occurs, or in another device (located remotely or within the operating region of the frequency band). By gathering information in the form of measurement and signal classification data, intelligence is acquired to make smart decisions (based on policies) as to how devices should use the frequency band, given the fact that other devices are also using it.

The spectrum management system may be divided into different processing levels, the lowest level of which, called the hardware management services, interfaces with the radio hardware in a device operating in the frequency band. The next highest level, called the engine services, interfaces with the hardware manager services to provide still higher level processing. A manager services level is above the engine services level and finally there is an application services level where software applications are executed. There are interfaces between the processing levels, called network spectrum interfaces (NSIs) that have associated application programming interfaces (APIs). Information is shared between the processing levels using the APIs.

In a variation, signal reception may occur in a device operating in the frequency band, those signals being converted to baseband digital signals, and coupled to a host device where all processing is performed in software executed by a processor on the host device. The host processor may be coupled to the device by a wired/bus interface, or by a wireless link. Alternatively, the device may include sufficient hardware or software processing capability to perform signal detection and even signal classification.

Objects and advantages of the present invention will become more readily apparent when reference is made to the following description taken in conjunction with the accompanying drawings.

BRIEF DESCRIPTION OF THE DRAWINGS

FIG. 20 is a diagram of an exemplary spectrum utilization map (SUM) built from spectrum analysis and other information obtained from a device operating in the frequency band.

DETAILED DESCRIPTION OF THE INVENTION

The system, methods, software and other technologies described herein are designed to cooperatively manage use of a frequency spectrum that has little or no use restrictions or requirements. However, many of the concepts described herein may apply to frequency spectrums that are not "unlicensed."

Figure 1:
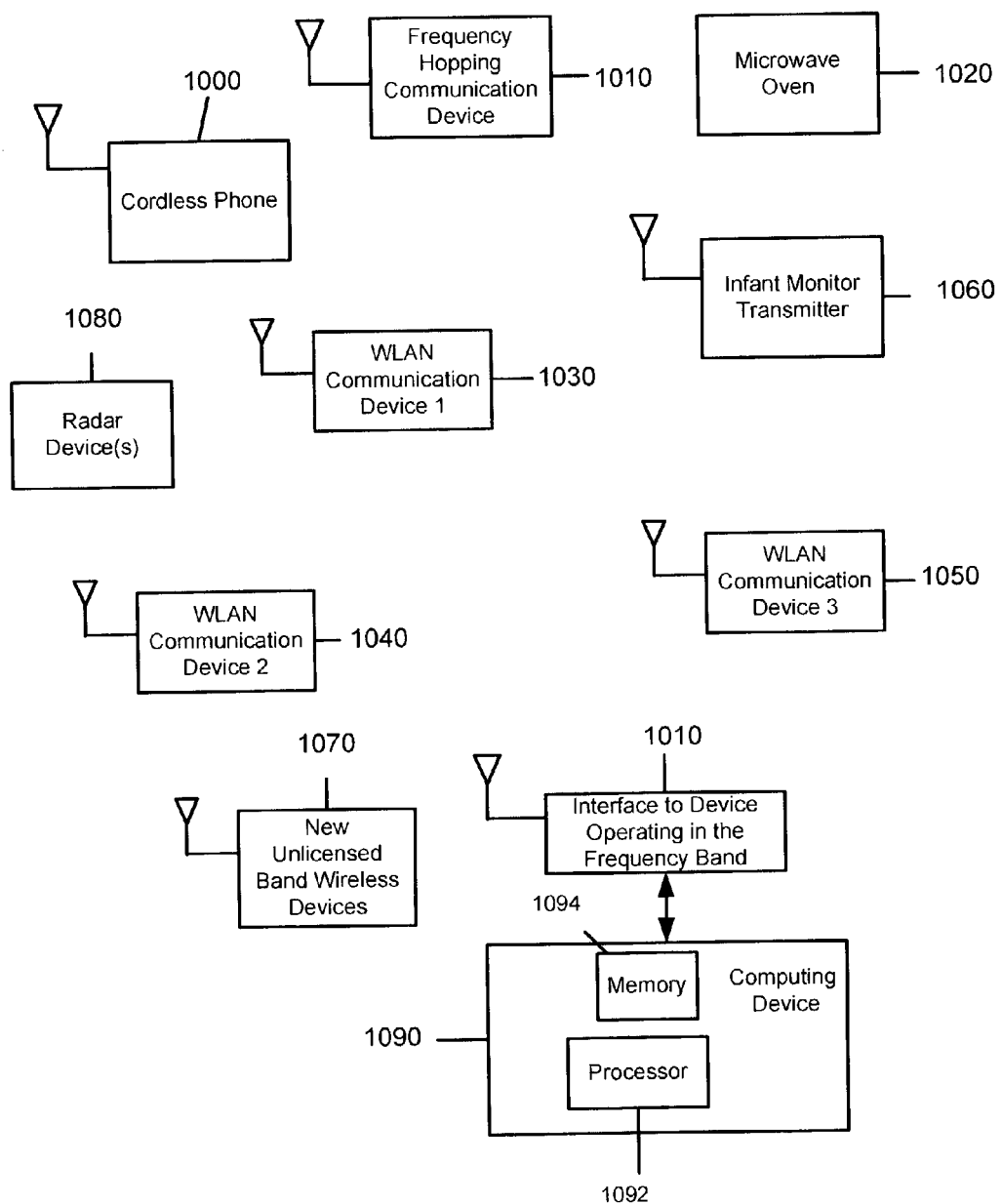
FIG. 1 is a block diagram showing multiple devices that may be operating simultaneously in a shared frequency band.

Referring first to FIG. 1, an environment is shown where there are multiple devices that at some point in their modes of operation, transmit signals within a common frequency band. When these devices are sufficiently close in proximity to each other, or transmit signals at sufficiently high power levels, there will inevitably be interference between signals of one or more devices. FIG. 1 shows a non-exhaustive exemplary selection of devices that may operate in an unlicensed frequency band, including cordless phones 1000, frequency hopping communication devices 1010, microwave ovens 1020, wireless local area network (WLAN) communication devices 1030, 1040 and 1050, infant monitor devices 1060 as well as any other existing or new wireless devices 1070. Cordless phones 1000 may be analog, digital and frequency hopping devices, depending on the type. Frequency hopping communication devices 1010 may include devices operating in accordance with the Bluetooth™ wireless communication protocol, the HomeRF™ wireless communication protocol, as well as cordless phones, as just mentioned. In addition, radar devices 1080 may operate in an unlicensed frequency band. Also shown in FIG. 1 is a computing device 1090 that may play a role in the spectrum management architecture described hereinafter. The computing device 1090 is shown in phantom because it need not physically reside in the region where the other devices are operating. It can send information to, and receive information from, a device operating in the frequency band via an interface device 1100. The interface device 1100 may be a WLAN communication device, such as an access point (AP) or any other device equipped (as described hereinafter) to detect and generate spectrum related information that is uploaded to the computing device 1090. The computing device 1090 has, for example, a processor 1092 and a memory 1094 that stores one or more software programs executed by the processor.

Currently, in the United States, the unlicensed frequency bands are in the Industry, Scientific and Medical (ISM) frequency bands, and include an unlicensed frequency band at 2.4 GHz and unlicensed frequency bands at or near 5 GHz. These are only examples of existing unlicensed bands. In other countries, other portions of the spectrum have been, or made be, set aside of unlicensed use. By definition, an "unlicensed" frequency band means that no one user has any preferred rights to use that frequency band over another. No one party has purchased exclusive rights to that spectrum. There are a set of basic power and bandwidth requirements associated with the unlicensed band, but any user that operates within those requirements is free to use it at any time. A consequence of the "unlicensed" character of these frequency bands is that devices operating in them will interfere with the operation of each other. Moreover, because these frequency bands are free to use, the zero-cost encourages more applications and users of the unlicensed band, which in turn, will make it more crowded and more susceptible to interference. There is, therefore, a need to manage the operation of devices operating in an unlicensed frequency band to ensure efficient and fair usage by all users.

Figure 2:
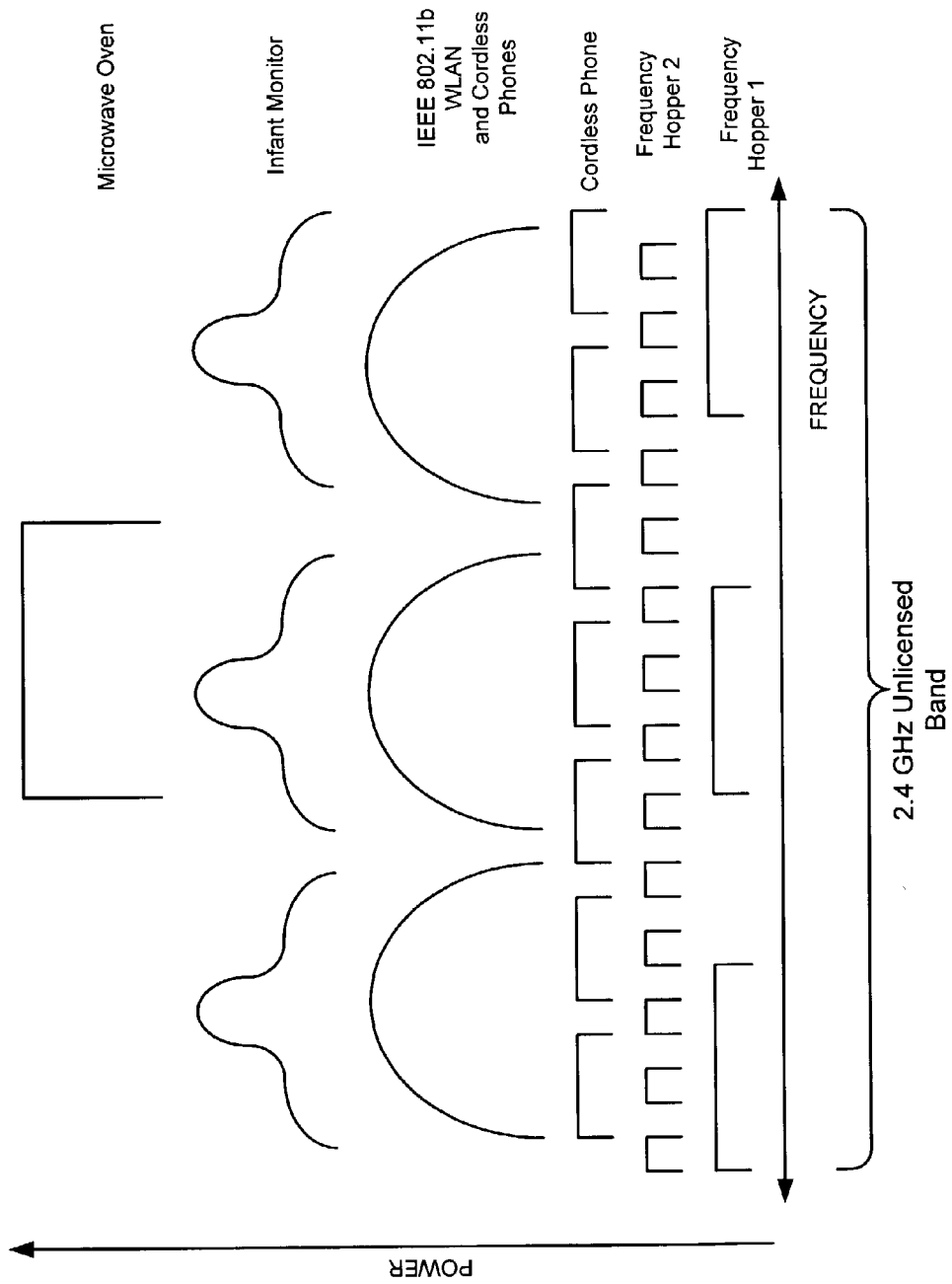
FIGS. 2 and 3 illustrate examples of the types of signals that may be simultaneously present in two exemplary radio frequency bands.
Figure 3:
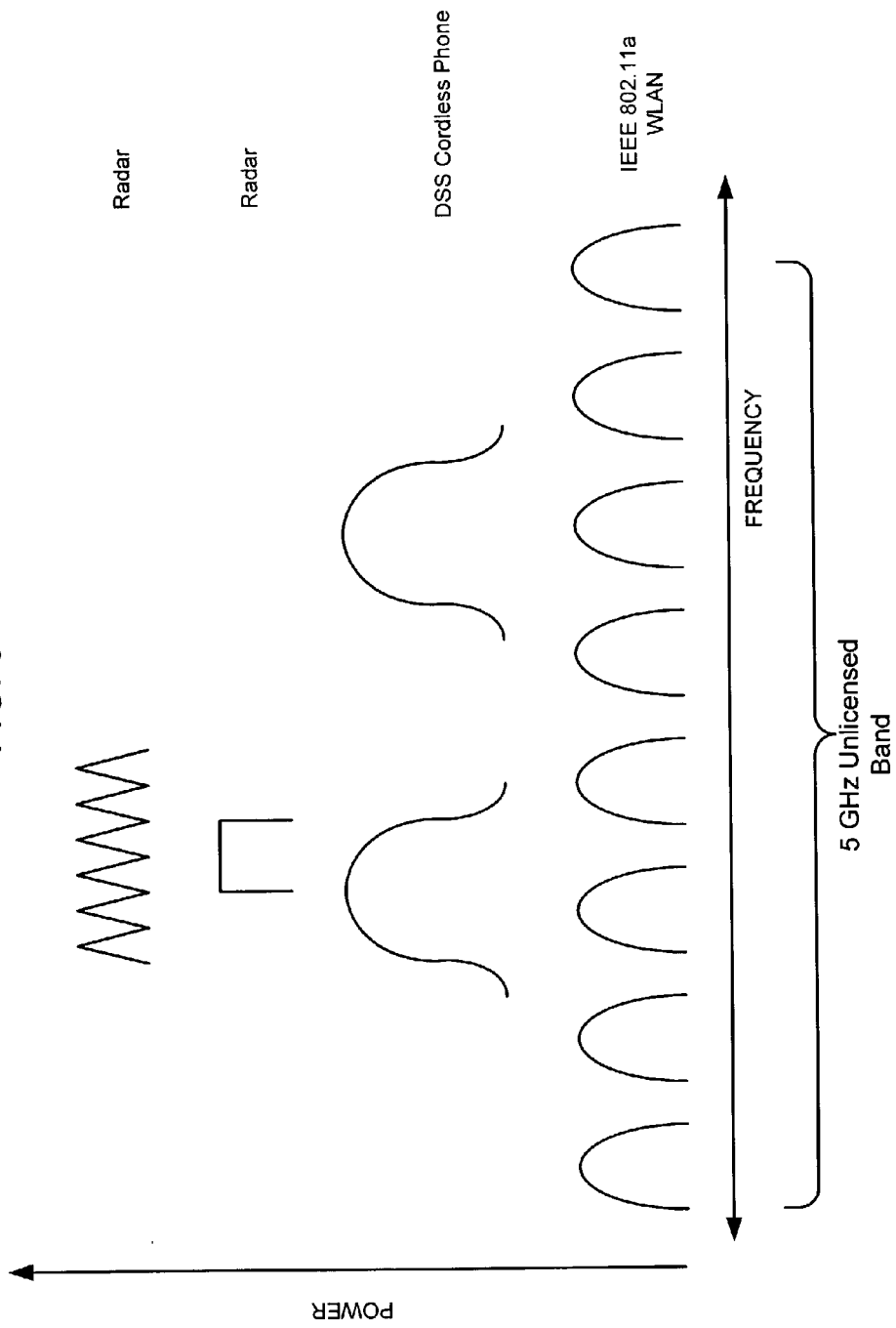

FIGS. 2 and 3 illustrate some examples of the spectral usage of two unlicensed bands in the United States. FIG. 2 shows the spectral profiles of exemplary devices that operate in the 2.4 GHz unlicensed frequency band such as for frequency hopper devices, cordless phones, IEEE 802.11b WLAN communication devices, infant monitor devices and microwave ovens. A frequency hopping device will occupy a predictable or random frequency sub-band at any given time, and therefore, over time, may span the entire frequency band. A cordless phone, of the non-frequency hopping variety, may occupy one of several frequency sub-bands (channels) at any given time. An IEEE 802.11b device will typically occupy one of three RF channels in the 2.4 GHz band at any given time, and an infant monitor is similar. A microwave oven will emit a burst of energy that may span a significant portion of the unlicensed band.

FIG. 3 shows a similar set of circumstances for the 5 GHz unlicensed bands. There are actually three unlicensed frequency bands at 5 GHz in the United States. Two of these are contiguous (and are meant to be represented by the diagram in FIG. 3) and the third is not contiguous with the other two (which for simplicity is not considered in FIG. 3). In the 5 GHz unlicensed bands, currently there are IEEE 802.11a WLAN devices operating in one of 8 different frequency sub-bands (channels), direct sequence spectrum (DSS) cordless phones, and various radar devices. At the time of this writing, the 5 GHz unlicensed band is relatively new, and not as widely used. However, as history has proven with the 2.4 GHz unlicensed band, greater use of the 5 GHz band is fully expected.

In an unlicensed band, it is inevitable that two or more of these devices will be transmitting at the same time. There is, therefore, a high likelihood that they will interfere with each other. When interference occurs, a signal from one device to another may not be received properly, causing the sending device to retransmit (and therefore reducing throughput), or possibly entirely destroying the communication link between two communication devices.

Managing an unlicensed band involves minimizing interference and maximizing spectrum efficiency. Minimizing interference is expressed in terms of signal-to-noise ratio (SNR), bit error rate (BER), etc., and maximizing spectrum efficiency is expressed as data rate per bandwidth used per area (bps/Hz/m$^2$) or as a number of "satisfied" users, where satisfied is based on meeting certain performance criteria such as: data rate; latency; jitter; dropped sessions; and blocked sessions. The goal of spectrum management is to take evasive action to avoid interference when possible, detect and report interference when it occurs and make intelligent decisions to mitigate interference when it cannot be avoided. Moreover, spectrum management is flexible to handle different customer demands and the emergence of new devices and type s of devices.

Figure 4:
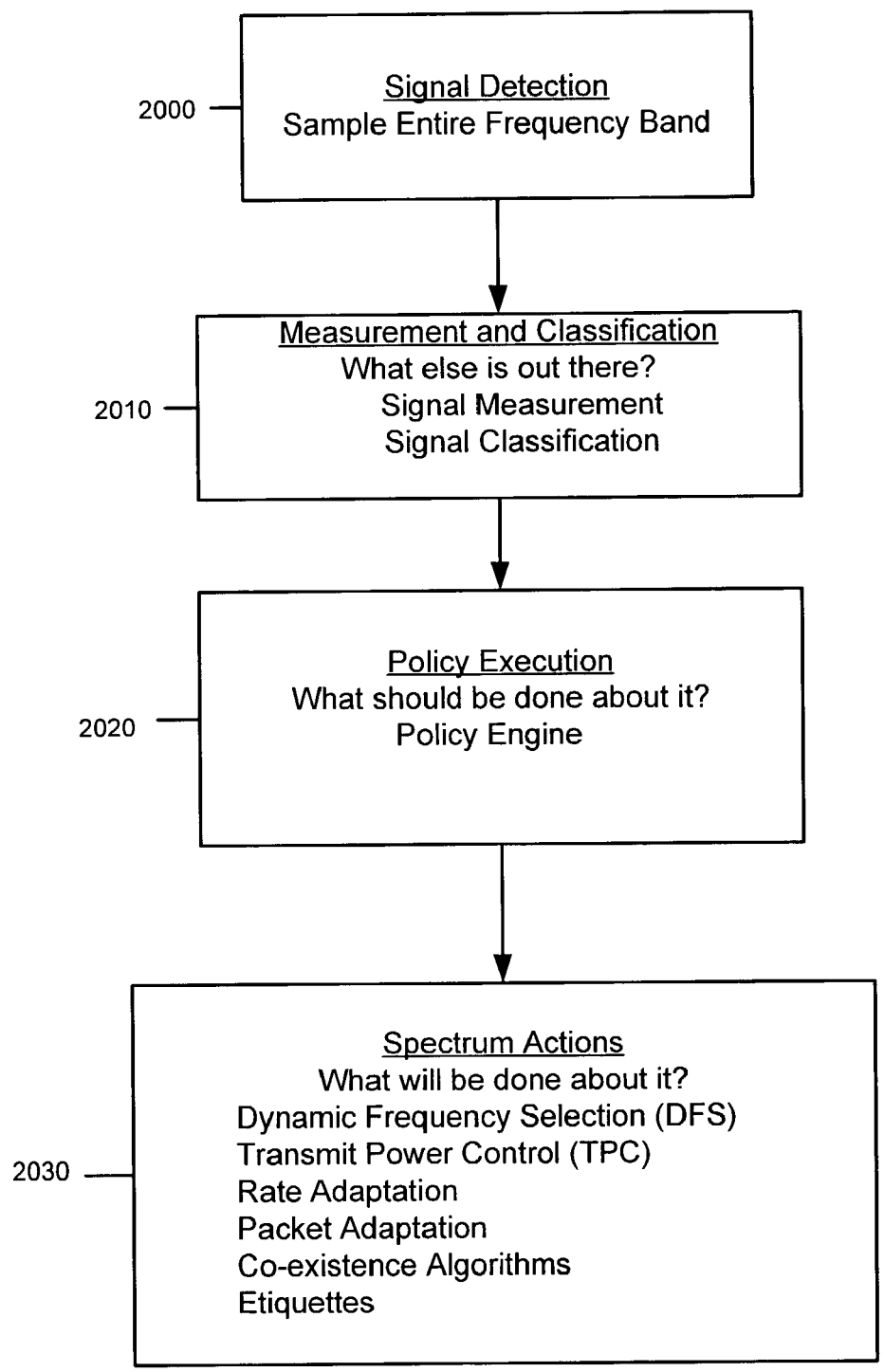
FIG. 4 is a general flow chart of the spectrum management process.

FIG. 4 illustrates the four basic steps associated with the spectrum management described in greater detail hereinafter. The signal detection step 2000 involves sampling the entire frequency band for a time period (on demand or periodically) to determine spectral-based and time-based activity in the frequency band. The measurement and classification step 2010 involves processing the output of the signal detection step to measure, and classify signals based on characteristics such as power, duration, bandwidth, frequency hopping nature and pulse characteristics. The output of the measurement and classification step 2010 is data describing the activity in the frequency band as well as identification or classification of the signals/devices detected. The policy execution step 2020 involves determining what, if anything, should be done about the information output by the measurement and classification step 2010. For example, the policy engine, described hereinafter, will act on policies that dictate what spectrum actions in the communication device to take on the basis of the output of the measurement and classification step 2010. The spectrum actions step 2030 is where these actions are executed in a communication device. Examples of actions that can be taken based on a policy include assigning a device to a different frequency sub-band or channel in the frequency band (dynamic frequency selection—DFS), network load balancing (on the basis of channel frequencies or time), adjusting the transmit power (transmit power control—TPC), adjusting the communication data rate, adjusting a parameter of the transmitted data packet, executing interference mitigation or co-existence algorithms, executing spectrum etiquette procedures, or executing spectrum priority schemes. Examples of interference mitigation algorithms are disclosed in commonly assigned and co-pending U.S. Patent Publication No. 20020061031, published, May 23, 2002. An example of a spectrum etiquette procedure is disclosed in U.S. Provisional Patent Application No. 60/365,776, filed Mar. 21, 2002, entitled Ad-Hoc Control Channel for Governing Use of the Unlicensed Band (UBACC). Other actions that can be taken include reporting spectrum activity information to users and administrators to enable human intelligence interaction to diagnose problems, optimize network settings and remove interference sources.

The Spectrum Management Architecture in General

Figure 5:
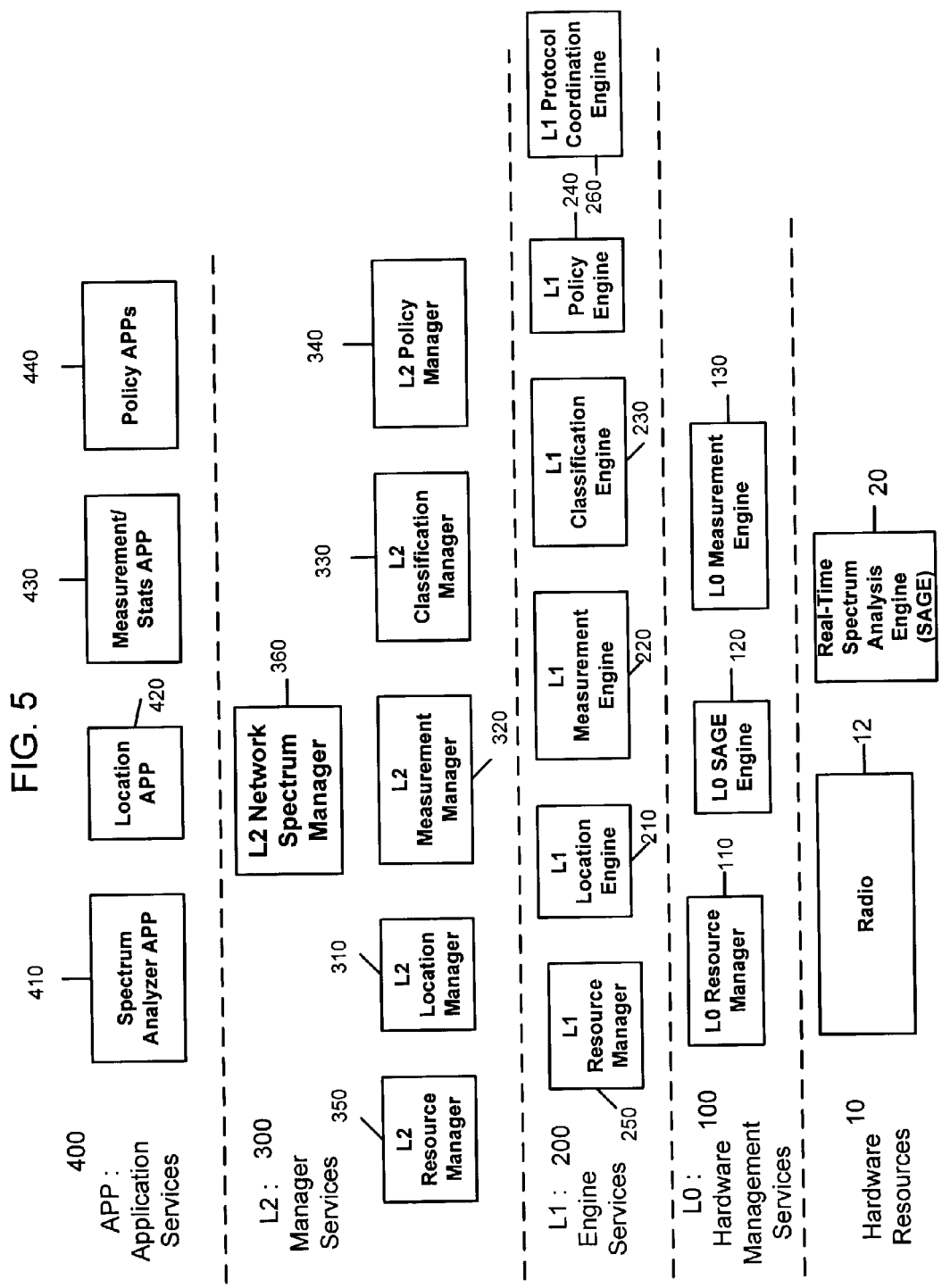
FIG. 5 is a more detailed block diagram of the various processes of the spectrum management architecture.

Referring to FIG. 5, the spectrum management system architecture is divided into several processing levels where software executes processes to be described further hereinafter. The software processing levels are:
1) L0: Hardware Management Services 100
2) L1: Engine Management Services 200
3) L2: Managers Services 300
4) APP: Applications Services 400

L0: Hardware Management Services

The L0 hardware management services 100 manages the hardware resources 10 used in the spectrum management system. These hardware resources reside in a communication device that is operating in a frequency band likely shared by other devices and communication devices. An exemplary communication device will be described hereinafter in conjunction with FIG. 6. Devices, such as the WLAN communication devices shown in FIG. 1, may have the capability of generating, delivering and acting on spectrum activity related information as described herein. However, this same capability can be incorporated into any device that operates in the unlicensed band. Management of hardware resources includes management of a radio (radio transceiver or receiver) 12 on the basis of contention management, and traffic data accumulation, to be described further hereinafter, and of a real-time spectrum analysis engine (SAGE) 20. The SAGE 20 is the subject of the aforementioned commonly assigned and co-pending patent application referred to above.

In the L0 hardware management services level 100, there are a L0 resource manager 110, a L0 SAGE engine 120 that manages the SAGE 20 and a L0 measurement engine 130. The L0 hardware management services may be executed "on-chip," meaning on the integrated circuits (ICs) that are included in the communication device to process signals for transmissions and reception in the network. This processing level may apply similarly to all communication devices operating in a network.

The L0 SAGE engine 120 is a device driver to interface higher level commands with the SAGE 20, and translate those commands into signals that the SAGE 20 can recognize. Commands may include configuration signals for one or more components of the SAGE 20, described hereinafter.

The L0 measurement engine 130 performs an initial accumulation of data output by the SAGE 20 into a spectrum utilization map (SUM) format. The spectrum utilization map will be described in greater detail hereinafter.

L1: Engine Services

The L1 engine services level 200 is where the first level measurement, classification, location, and policy services execute. In the engine services level, there are L1 engines, such as a L1 location engine 210, L1 measurement engine 220, L1 classification engine 230 and L1 policy engine 240 that control the L0 hardware management level processes and use the information to perform their next level services. There is also a L1 resource manager 250 in the engine management level 200. A protocol coordination engine 260 resides in the L1 engine services level 200, and it performs functions related to protocol management; it does not play a vital role in spectrum management.

The L1 engine services level 200 is normally performed "off-chip," that is in a host processor of the communication device. However some L1 processing could be performed on-chip if additional external memory is supported. Some local policy decisions, such as local interference mitigation, may be decided at the L1 Engine processing level. The L1 engine services level may apply similarly to all communication devices operating in the network.

L2: Manager Services Level

The next higher level is the L2 manager services level 300. The L2 manager services are responsible for more complex network spectrum management functions. Examples of processes at this level are the L2 location manager 310, L2 measurement manager 320, L2 classification manager 330 and L2 policy manager 340. There are also a L2 resource manager 350 and a L2 network spectrum manager 360. The processing at this level may be performed at a central server location which consolidates the information for processing, and not necessarily by a communication device operating in the network.

For example, network level consolidation of location parameters are used to calculate the location of a device in the network. High level network policies such as load balancing and access point channel assignments are managed at the L2 processing level.

APP: Applications Services Level

The highest level in the system architecture is the APP applications services level 400 where the network applications execute. Examples of network include a spectrum analyzer display application 410, a location/map display application 420, a measurement/statistics application 430 and a spectrum management policy application 440.

An Exemplary Communication Device

Figure 6:
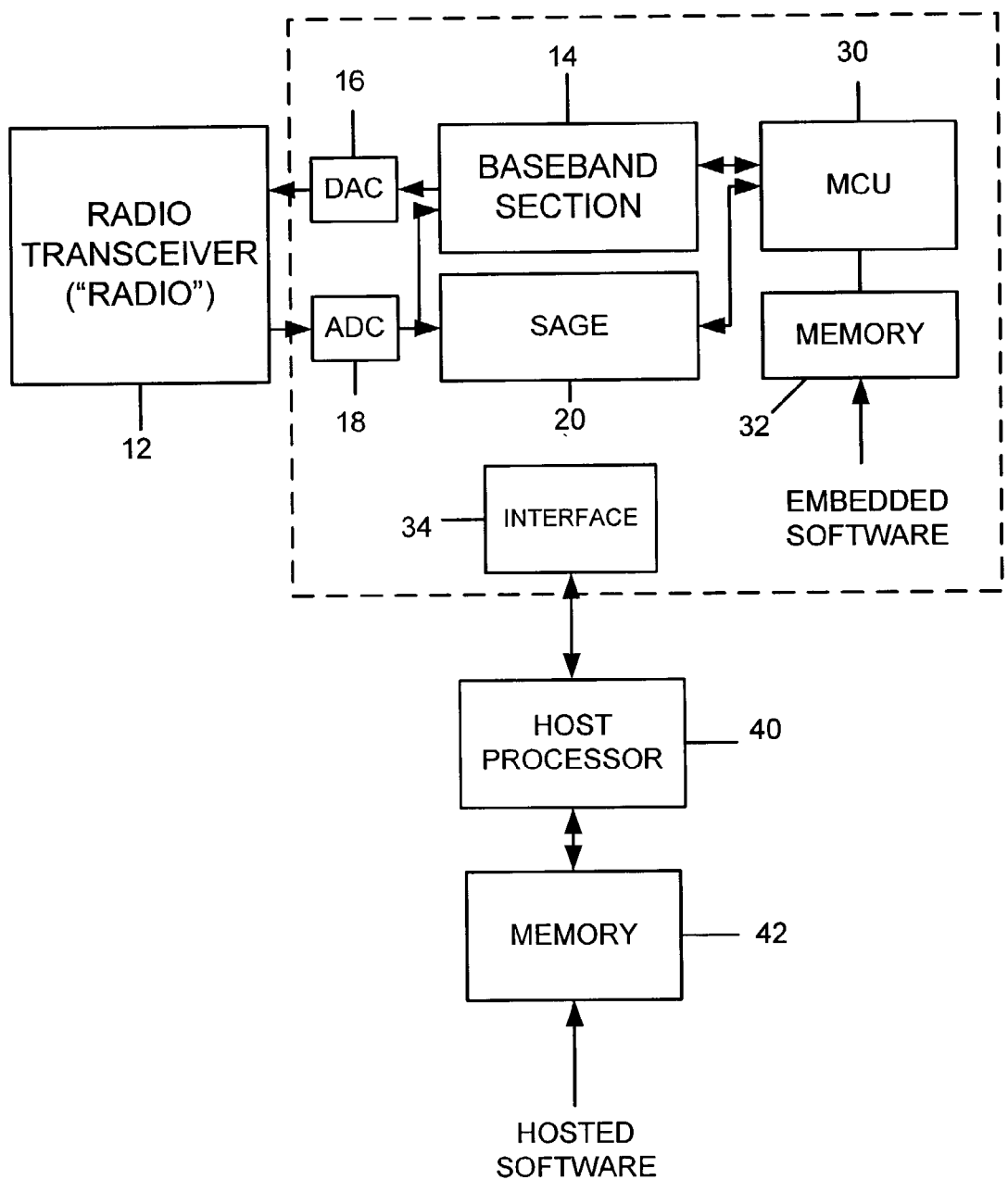
FIG. 6 is a block diagram of a communication device which plays a part in the spectrum management process.

FIG. 6 shows an example of a radio communication device that operates in the frequency band and forms a part of the spectrum management architecture. The communication device comprises the radio frequency (RF) transceiver ("radio") 12 that upconverts signals for transmission and downconverts received signals. The radio 12 is capable of wideband operation to receive sample the entire unlicensed band for purposes of spectrum management in order to obtain both time and frequency information of activity in the frequency band. An example of a wideband radio transceiver architecture is disclosed in U.S. Provisional Application No. 60/374,531, entitled "System and Architecture for Wireless Transceiver Employing Composite Beamforming and Spectrum Management Techniques," filed Apr. 22, 2002 and in U.S. Provisional Application No. 60/319,434, filed Jul. 30, 2002, entitled "Radio Transceiver Having Multiple Integrated Receive and Transmit Paths and a Wideband Operation Mode." Another example of a wideband radio transceiver is in International Patent Application No. PCT/US01/32642, filed Oct. 29, 2001, entitled "Wideband Multi-Protocol Radio Transceiver System." In addition, the radio 12 is capable of operating in a narrowband mode to transmit and/or receive a signal in a single RF channel in the frequency band.

A baseband section 14 is coupled to the radio 12 and performs digital baseband processing of signals. One or more analog-to-digital converters (ADCs) 16 convert the analog baseband signals output by the radio 12 to digital signals. Similarly, one or more digital-to-analog converters (DACs) 18 convert digital signals generated by the baseband section 14 for upconversion by the radio 12. The SAGE 20, referred to in FIG. 1, is shown as receiving input from the ADCs 16. The SAGE 20 generates the raw spectrum information for the entire frequency band when the communication device is in a wideband mode, as well as other information about the activity in the frequency band. The SAGE 20 will be described in further detail in conjunction with FIG. 3.

A microprocessor control unit (MCU) 30 is provided that is coupled to the baseband section 14 and to the SAGE 20. The MCU 30 executes instructions stored in memory 32 to perform several of the software spectrum management functions that are described herein as being "on-chip" or "embedded" software functions, such as the L0 hardware management services 100. Thus, some of the software stored in memory 32 is referred to herein as on-chip or embedded software. The phantom line shown in FIG. 6 is meant to indicate that several or all of those elements surrounded thereby may be fabricated into a single digital application specific integrated circuit (ASIC). The L0 hardware management services 100 are performed by the embedded or on-chip software. It is also possible that some or all of the L1 engine services can be performed by embedded or on-chip software.

A host processor 40 may be provided that is coupled to the processor 30 by a suitable interface 34. The host processor 40 may be part of a host device. Memory 42 stores hosted or "off-chip" software to perform higher level spectrum management functions. For example, the L1 engine services 200 is performed by the hosted or off-chip software.

As described above, the L2 manager services 300 and application services 400 may be executed by a computer server that may be remote from communication devices, such as the computing device 1090 shown in FIG. 1. The remote server may have wireless communication capability (or is linked by wire through another device that has wireless communication capability with the communication devices). Software to execute the L2 manager services 300 and application services 400 may reside on the remote server.

The Spectrum Analysis Engine Briefly

Figure 7:
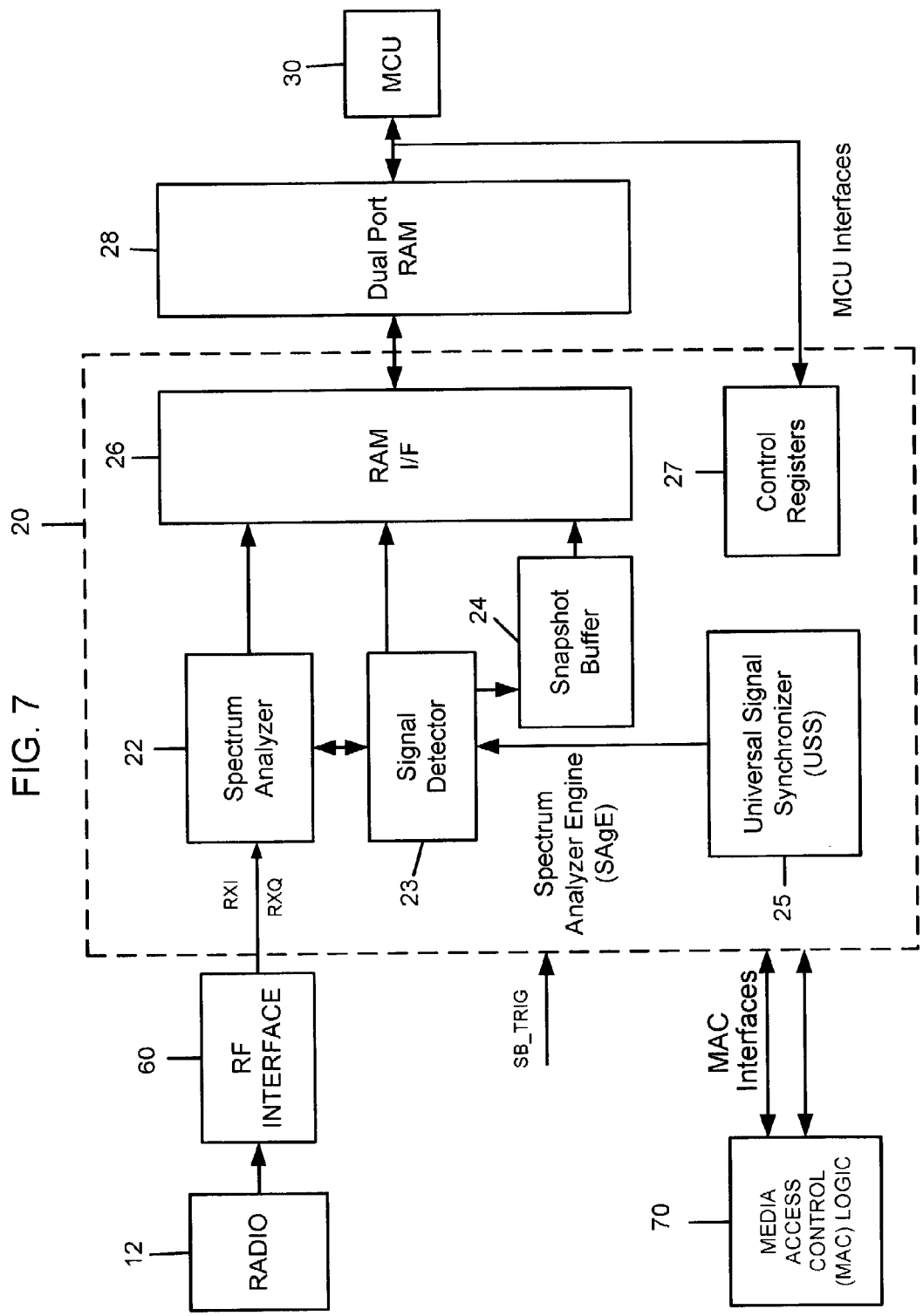
FIG. 7 is a block diagram of a spectrum analysis engine (SAGE) useful to generate low level spectrum information used in the spectrum management process.

FIG. 7 shows the SAGE 20 in additional detail. The following description is intended to provide an understanding of how the SAGE 20 is involved in the spectrum management architecture, not to fully describe the structure and operation of the SAGE 20. Further details on the SAGE 20 are disclosed in the aforementioned U.S. patent application filed on even date.

The SAGE is a VLSI accelerator useful to obtain in real-time information about the activity in a frequency band.

The SAGE 20 comprises a spectrum analyzer (SA) 22, a signal detector (SD) 23, a snapshot buffer (SB) 24 and a universal signal synchronizer USS 25. The SA 22 generates data representing a real-time spectrogram of a bandwidth of RF spectrum, such as, for example, up to 100 MHz. As such, the SA 22 may be used to monitor all activity in a frequency band, such as the 2.4 GHz or 5 GHz ISM bands. Power vs. frequency information generated by SAGE 10 is stored in a dual-port RAM (DPR) 28, as well as other information such as statistics duty cycle, maximum power and a peaks histogram. Duty cycle is a running count of the number of times the power at a FFT frequency exceeds a power threshold. Maximum power at a particular FFT frequency is tracked by over time. The peaks histogram tracks the number of peaks detected over time sampling intervals.

The signal detector 23 detects receive signal pulses in the frequency band. Pulse event information entries are output, which include the start time, duration, power, center frequency and bandwidth of each detected pulse. The signal detector 23 also provides pulse trigger outputs which may be used to enable/disable the collection of information by the spectrum analyzer 22 and the snapshot buffer 24 components. The signal detector 23 includes a peak detector and one or several pulse detector. Each pulse detector can be configured to identify a pulse that has a certain set of pulse characteristics, such as center frequency, bandwidth, power and duration.

The snapshot buffer 24 collects a set of raw digital signal samples useful for signal classification and other purposes, such as time of arrival location measurements. The snapshot buffer 24 can be triggered to begin sample collection from either the SD 23 or from an external trigger source using the snapshot trigger signal SB_TRIG.

The universal signal synchronizer 25 detects and synchronizes to periodic signal sources, such as frequency hopping signals (e.g., Bluetooth™ SCO and certain cordless phones). The USS 25 interfaces with medium access control (MAC) logic 70 that manages scheduling of packet transmissions in the frequency band according to a MAC protocol, such as, for example, the IEEE 802.11 protocol. The MAC logic 70 may be implemented in DSP firmware, or in higher level software. The USS includes one or more universal clock modules (UCMs) each of which can be configured to track the clock of a signal identified by a pulse detector in the signal detector 23.

The MCU 30 interfaces with the SAGE 20 to receive spectrum information output by SAGE 20, and to control certain operational parameters of SAGE 20. The MCU 30 may be any suitable microprocessor that resides either on the same semiconductor chip as the SAGE 20, or on another chip. The MCU interfaces with SAGE 20 through the DPR 28 and the control registers 27. The SAGE 20 interfaces with the MCU 30 through a RAM interface (I/F) 26 that is coupled to the DPR 28.

The control registers 27 include registers to enable the MCU 30 to configure, control and monitor the SAGE 20. There is a control/status register, an interrupt enable register, an interrupt flags register, spectrum analyzer control registers, signal detector control registers, snapshot buffer control registers and USS control registers. The control/status register includes a field to perform a reset of the SAGE components.

The SAGE 20 operates on digital signals derived from the baseband signals output by the radio 12. An RF interface 60 is provided that pre-processes the baseband signals for processing by the SAGE 20.

Figure 8:
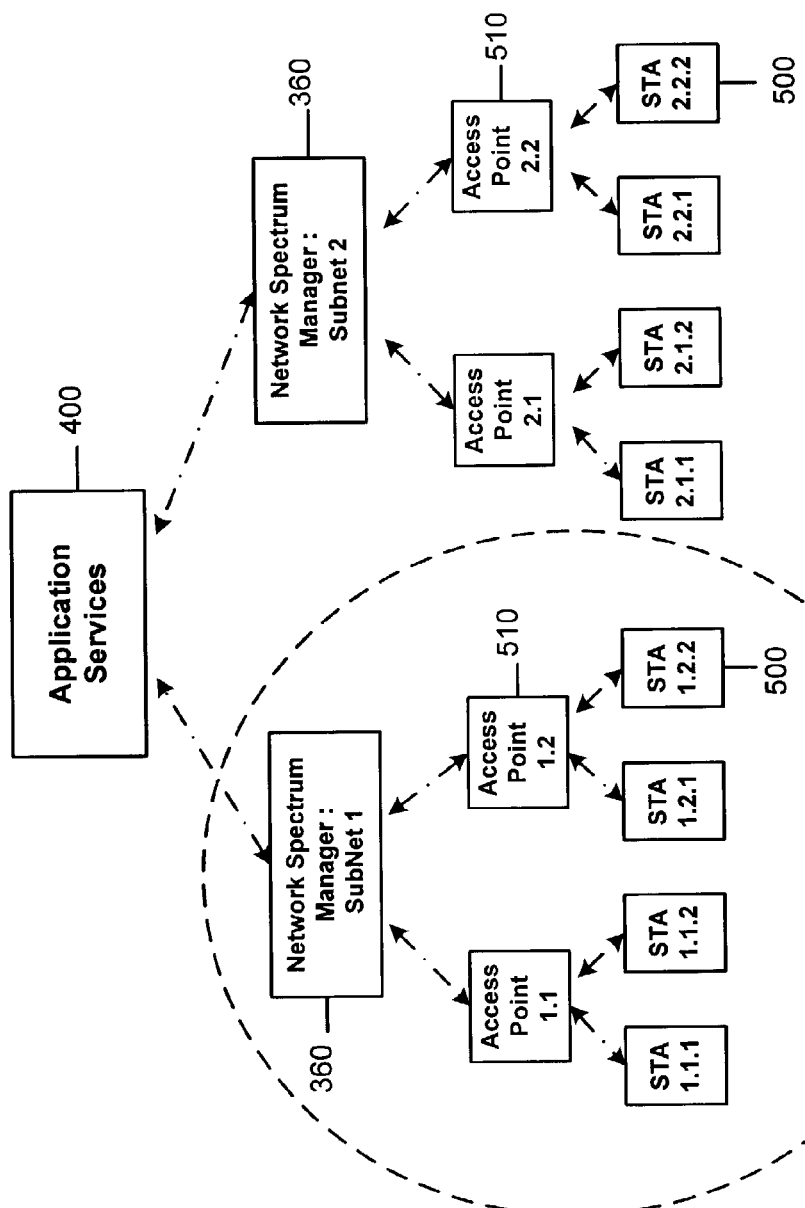
FIG. 8 is a block diagram showing a hierarchical interaction between devices in a wireless local area network (WLAN) application of the spectrum management process.

Referring to FIG. 8, from the perspective of spectrum management a network may comprise devices such as stations (STAs) 500, access points (APs) 510, an overseeing network spectrum manager 360 and applications services 400. An instance of a network spectrum manager 360 is responsible for a subnet consisting of APs 510 and their associated STAs 500. While the terms STA and AP are used herein, which have relevance to IEEE 802.11x wireless local area network (WLAN) applications, it should be understood that the spectrum management architecture and processes described herein may apply to any wireless communication application. The network spectrum manager 360, as mentioned above, may reside on a server computer (e.g., computing device 1090 in FIG. 1) coupled by wire or wireless link to the APs within its subnet. In many cases, the subnet is in fact the entire network in question. That is, the network consists of a single subnet.

Spectrum management is designed to work in cooperation with parallel foreign network management entities. For example, a "foreign" general network management system might be in place for enabling, disabling, and configuring network components such as APs. The network spectrum manager has a service interface that permits notification of such changes by a foreign network management system. Similarly, spectrum management provides a service interface so that a foreign network management system may be notified of changes within the network such as channel assignments and STA associations. This network update service interface may be used by any conforming application in the application services 400.

Referring again to FIG. 5, examples of spectrum management services include location, measurement, classification, and policy management. Policy management controls algorithms governing co-existence among communication devices of different types operating in the frequency band, channel assignment of devices in the frequency band, transmit power control of devices operating in the frequency band and bandwidth allocated to devices operating in the frequency band.

Most spectrum management services are independent of specific media access protocols. For example, spectrum analysis, classification, radio measurements, and some policies are protocol independent. In addition to these protocol independent services, spectrum management also provides some protocol specific support, such as support for traffic statistics associated with a particular medium access protocol, such as IEEE 802.11x and co-existence algorithms. However, the overall spectrum management architecture may be applied to any frequency band, such as the ISM unlicensed bands in the United States and unlicensed bands in other jurisdictions around the world.

The Network Spectrum Interfaces (NSIs)

Figure 9:
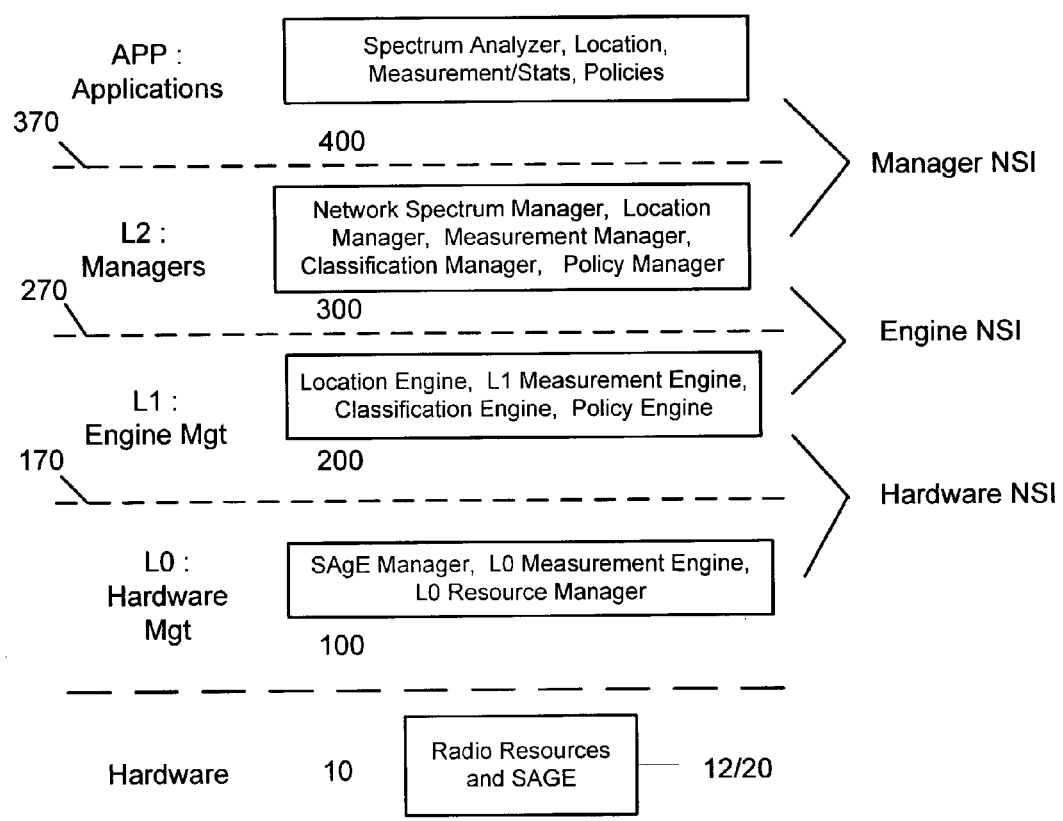
FIGS. 9 and 10 are block diagrams showing the network spectrum interfaces (NSIs) between various process levels of the spectrum management architecture.

Turning to FIG. 9, the concept of a network spectrum interface (NSI) is described. The NSI is a set of interfaces between the spectrum management processing levels. The NSI interfaces include:

1) a Hardware NSI 170 that interfaces the L0 hardware management services 100 to the L1 engine management services 200.

2) an Engine NSI 270 that interfaces the L1 engine management services 200 to the L2 manager services 300.

3) a Manager NSI 370 that interfaces the L2 manager services 300 to the applications services 400.

The NSI is a logical interface which is embodied in a variety of program interfaces and transport mechanisms, and may employ any suitable transport mechanism. This primarily affects the Hardware NSI 170. For example, if the L0 hardware management services executes on-chip and the L1 engine management services executes within a host device driver, the transport mechanism for the Hardware NSI may be over a PCI interface, for example. On the other hand, if the L0 hardware management services executes on-chip alongside the L1 engine management services, then the transport may be a local (on-chip) software interface. In either case the Hardware NSI service model would be the same.

Figure 10:
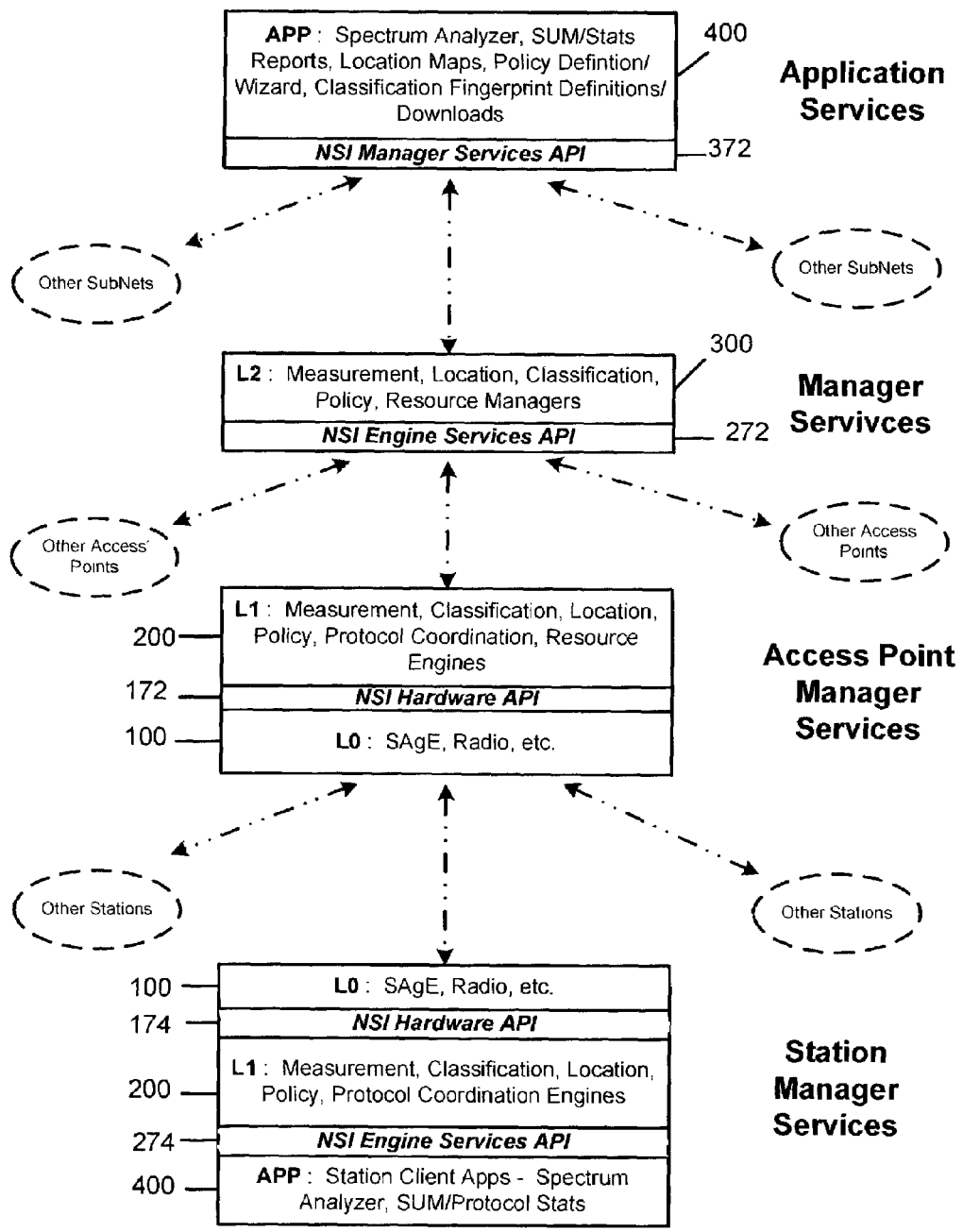

FIG. 10 shows how the NSIs are used between the various levels of the spectrum management software architecture in the context of the network hierarchy shown in FIG. 2. For each of the NSIs, there is an application programming interface (API) that defines the transport protocol for that interface. At the highest level in the spectrum management architecture, there is an NSI manager services API 372 that defines how information is exchanged between the L2 manager services 300 and the applications services 400. The NSI manager services API 372 of any subnet may interface with L2 manager services of the same subnet and other subnets. At the next level down, there is a NSI engine services API 272 that defines how information is exchanged between the L2 manager services 300 and the L1 engine services 200 executing in APs for that subnet. There is an NSI hardware API 172 that defines how information is exchanged between the L1 engine management services 200 and the L0 hardware management services 100 in each AP.

At the STA network level, there also is a NSI hardware API 174 that defines the information exchange between the L0 hardware management services 100 in a STA with the L1 engine management services 200 in the STA. Similarly, there is a NSI engine services API 274 that defines the information exchange between the L1 engine management services 200 and the applications services 400 in the STA.

The Resource Managers

Figure 11:
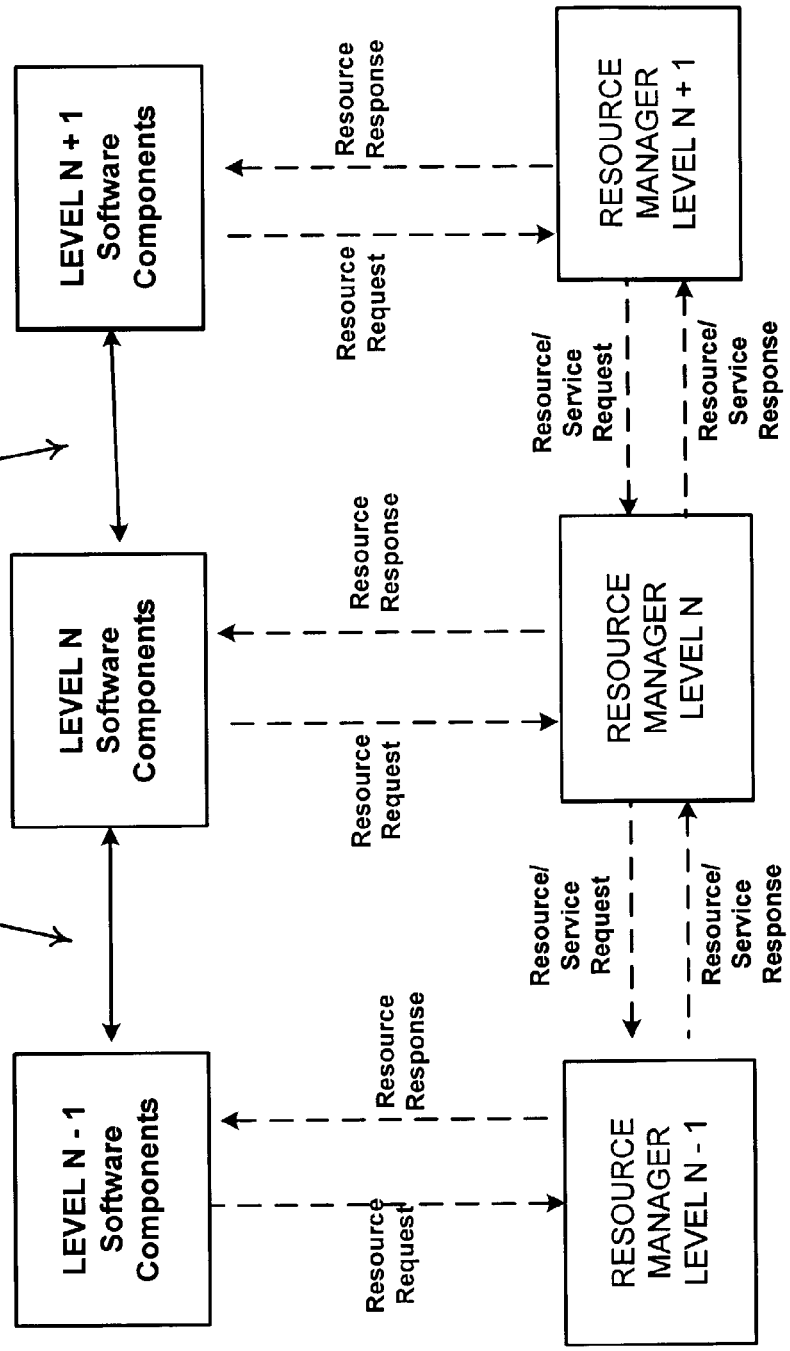
FIG. 11 is a flow diagram showing interaction between resource managers in the various software levels of the spectrum management system.

Referring to FIG. 11, the resource manager function will be described. Within each network component at each level of the spectrum management software architecture is a resource manager. The resource manager is responsible for (1) mediating contention for common resources (such as the radio transceiver and SAGE) between software components at the same level; and (2) requesting access to common lower level resources; and (3) responding to requests from upper levels to schedule services by that level. Where possible the resource manager will already have knowledge and complete control over the scheduling of use of the lower level resource. However there may be occasions when the lower level will need to be consulted as to when a lower resource has become available. Once a service request has been granted the upper layer components will generally interact directly with the lower layer counterparts. When coordination of resources is required across a network, the L2 network spectrum manager 360 coordinates the various resource managers involved.

Figure 12:
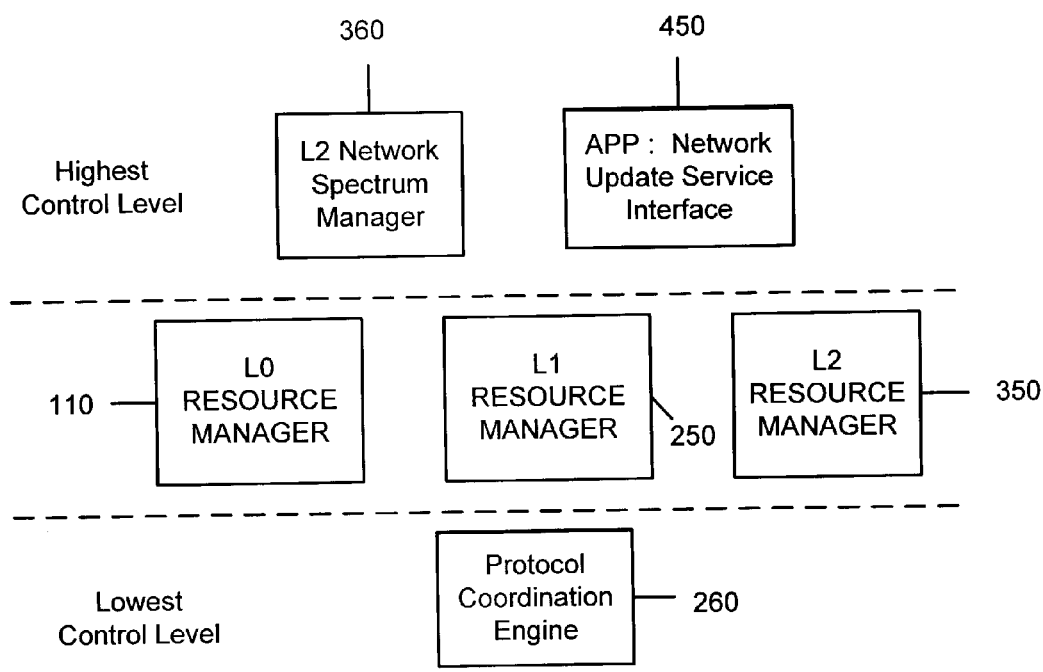
FIGS. 12 and 13 are block diagrams showing other hierarchical relationships between processing levels of the spectrum management architecture.

Turning to FIG. 12, spectrum management is involved with the scheduling and co-ordination of resources that are required to deliver spectrum management services such as classification, location, and measurement. Spectrum intelligence is the transformation of raw data into higher level information content for the intelligent use of that information.

The software components involved in managing network resources are the resource managers in each software level and the L2 network spectrum manager 360. The L2 network spectrum manager 360 manages resources across the network. It is essentially the master of network control. The network updates service interface 450 is an application service that manages update requests that can come from foreign network management systems or other upper layer applications. These requests are fielded by the L2 network spectrum manager 360 and may have effects across the network.

The L0 and L1 resource managers 110 and 250, respectively, are only responsible for managing resource requests within their own network component (STA or AP). The L2 resource manager manages cross network resource requests. However it does not manage any activities. It is essentially manages the inventory of resources that the L2 network spectrum manager 360 controls.

For each MAC protocol that is actively managed by L2 network spectrum manager 360, there is an L1 protocol coordination engine 260 (FIG. 15) which manages the actual protocol MAC engine.

The software components shown in FIG. 12 control network activities, but they do not make intelligent choices as to what actions to take. These intelligent decisions are either made by the policy engines/managers or by an application in the applications services level 400.

Figure 13:
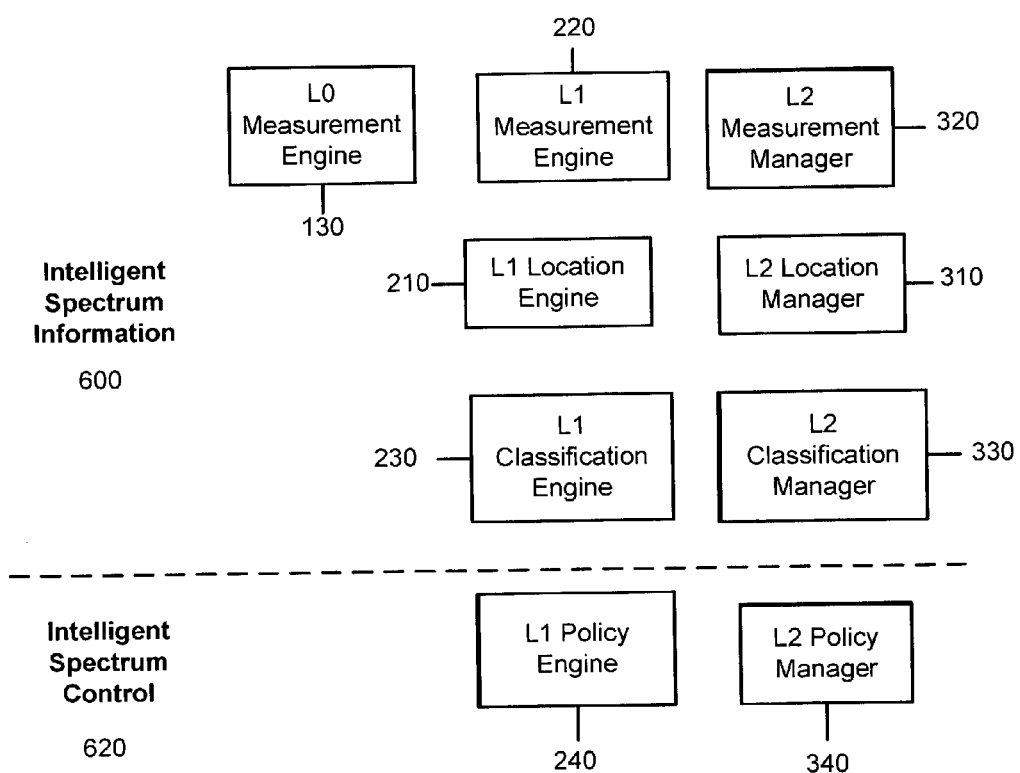

Referring to FIG. 13, the concept of spectrum intelligence is further described. Spectrum intelligence manifests itself in two general categories: intelligent spectrum information 600 and intelligent spectrum control 620. Intelligent spectrum information 600 is the result of converting raw spectrum activity data into increasingly higher information content. For example, the L0 SAGE engine 120 captures pulse events which are analyzed by the L1 classification engine 230 which in turn passes the pre-processed results to the L2 classification manager 330 for further analysis when necessary.

Intelligent spectrum control 620 are the commands that are generated which, when acted upon, change the behavior of a device operating in the frequency band that impacts the usage of the frequency band. The L1 policy engine 240 and L2 policy manager 340 are the primary mechanisms for intelligent response to network conditions. The actions include AP channel selection, STA load balancing, and interference mitigation (co-existence algorithms), etc. In addition the Manager NSI 370 (FIG. 4) provides a policy manager service interface which allows higher level network applications to update or influence policies.

Figure 14:
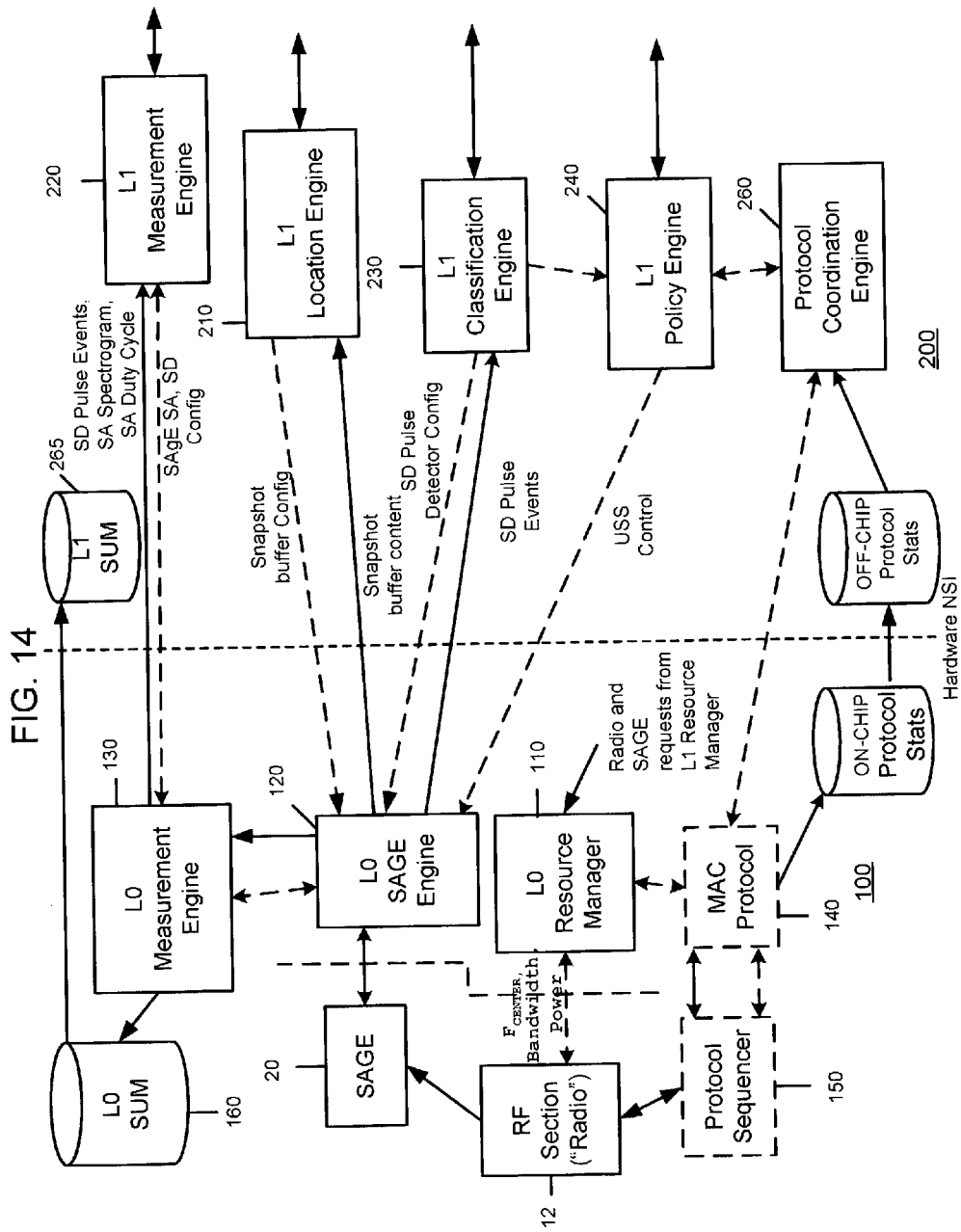
FIG. 14 is a more detailed block diagram showing the interaction between the L1 engine services and the L0 hardware management services.
Figure 15:
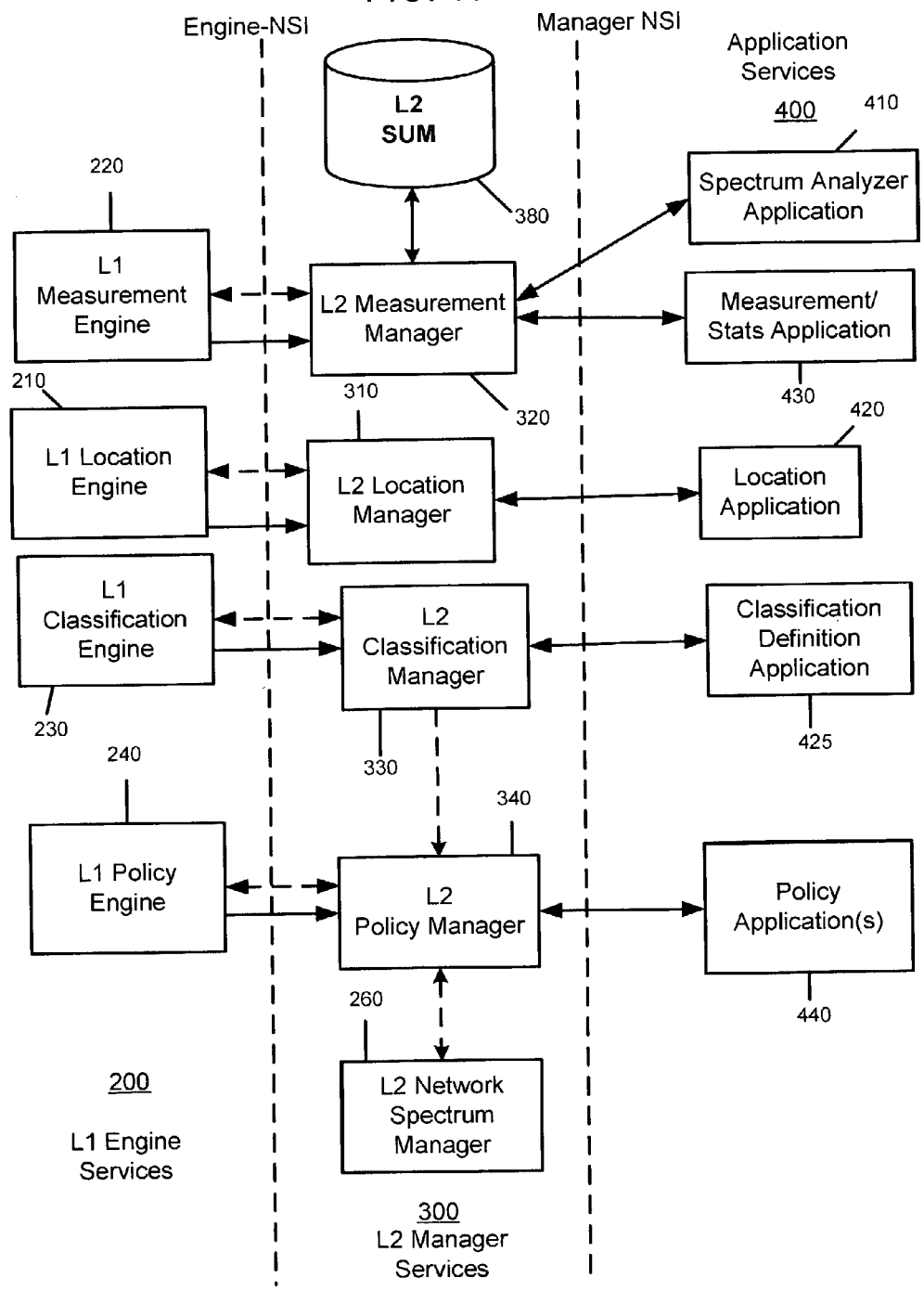
FIG. 15 is a more detailed block diagram showing the interaction between the L2 manager services and the L1 engine services, as well as between the L2 manager services an the application services.

FIGS. 14 and 15 show more details about the interaction between modules in the different levels of the spectrum management system. In these diagrams, solid lines between blocks represent data flow and dashed lines represent controls.

FIG. 14 shows the interface of information between the L0 hardware management services and the hardware resources, and the interface of information by the hardware NSI between the L0 hardware management services and the L1 engine services. The L0 resource manager 110 manages use of the radio resources to prevent conflicting uses of the radio. For example, the L0 resource manager 110 may receive requests from the L1 resource manager for performing a spectrum management task, such as changing a center frequency, bandwidth or power, or for SAGE function/control requests. The L0 resource manager 110 will generate control signals to control center frequency, bandwidth and/or output power level used by the radio, and will arbitrate use of the radio between a MAC protocol process 140 for receiving or transmitting signals and SAGE requests. For example, when transmitting and/or receiving signals according to a MAC protocol, L0 resource manager 110 will set the bandwidth of the radio to operate in a narrowband mode whereby the radio downconverts only a portion of the frequency band (where a signal is expected to be present) or upconvert to only a portion of the frequency band where a signal is to be transmitted and the protocol sequencer 150 will have use of the radio. On the other hand, when operating the SAGE 20, the L0 resource manager 110 will control the radio to operate in a wideband mode to sample the entire or substantial portions of the frequency band for spectrum management functions, or to transmit a wideband signal in the frequency band. Based on the received request, the L0 resource manager 110 will set the duration of use of the radio for SAGE or signal communication functions.

The L0 SAGE engine 120 provides device driver, configuration and interface management for the SAGE 20. These responsibilities include utilization of the SAGE Dual Port Ram (DPR). The SAGE Dual Port Ram is used by several SAGE internal components. The L0 SAGE Engine 120 is responsible for assigning DPR resources to the various applications and refusing request when the DPR resources are not currently available. The L0 SAGE engine 120 transfers SAGE information to other L0 subsystems, such as to the L0 measurement engine 130 or off-chip to the L1 classification engine 230.

The L0 SAGE engine 120 receives configuration information for several of its components from L1 engines. For example, it receives configuration information for the snapshot buffer from the L1 location engine 210, and upon an appropriate triggering event, supplied snapshot buffer content to the L1 location engine 210. Similarly, the L0 SAGE engine 120 receives SAGE signal detector configuration information from the L1 classification engine 230. The L0 SAGE engine 120 outputs signal detector pulse events to the L1 classification engine 230. The L1 policy engine 240 provides controls for the USS component of the SAGE 20.

The L1 measurement engine 220 exchanges configuration information for the SAGE spectrum analyzer and signal detector with the L0 measurement engine 130. In addition, the L0 measurement engine outputs pulse events from the SAGE signal detector, as well as stats and duty cycle information from the SAGE spectrum analyzer. The L0 measurement engine 120 accumulates this information which constitutes the initial information for the spectrum utilization map (SUM). At this level, this information is referred to as the L0 SUM 160. The L0 SUM 160 may be periodically passed off-chip to the L1 SUM 265 and to the L1 measurement engine 220 for accumulation into the L2 SUM.

The L1 measurement engine 220 provides to L2 managers power versus frequency (PF) spectrogram information and spectrum analyzer statistics generated by the spectrum analyzer of the SAGE 20, as well as pulse events output by the SAGE signal detector. The L1 measurement engine 130 may receive SAGE spectrum analyzer configuration information from the L2 measurement manager 320 to configure such things as a lowpass filter parameter, decimation factor, etc. The L1 measurement engine 220 outputs a timestamp and associated received signal strength indicator (RSSI) power values for each of a plurality of Fast Fourier Transform (FFT) bins. For the spectrum analyzer statistics, the spectrum analyzer of the SAGE 20 may similarly be configured as to a lowpass filter parameter, decimation factor, cycle counter (number of spectrum analyzer updates performed prior to forwarding the stats) and minimum power for duty counting. The spectrum analyzer stats include a timestamp and associated stats for each FFT bin, including average power, maximum power and number of time above a minimum power.

Pulse events are output by the pulse detector components of the SAGE signal detector. The SAGE contains, for example, four pulse detectors. The L1 measurement engine 220 collects pulse events. More than one L1 user may use the same stream of pulse events. For example, the L2 classification manager 330 may use the pulse events to perform more detailed classification. The same stream of pulse events is also examined by the L1 classification engine 230.

A user of the pulse event stream may specify a specific pulse detector by specifying a signal detector ID such as, fore example, 0 to 3. Otherwise the L2 network spectrum manager 360 chooses the pulse detector. The configuration information for a pulse detector includes ID, bandwidth threshold, minimum center frequency, maximum center frequency, minimum power threshold, minimum pulse bandwidth, maximum pulse bandwidth, minimum pulse duration, etc. Further details on the configuration of a pulse detector are disclosed in the aforementioned co-pending application on the SAGE.

The pulse event data stream comprises, for example, an signal detector ID, center frequency (at the beginning of the pulse), pulse bandwidth (at the beginning of the pulse), pulse duration, timestamp for the start of the pulse event, counter value for a down counter in the universal clock module associated with the pulse detector and pulse power estimate (at the beginning of the pulse).

The L1 classification engine 230 performs the first level of signal classification. Details of signal classification procedures are disclosed in the aforementioned commonly assigned patent application. The L1 classification engine 230 outputs fingerprint identification of a signal or pulse by matching statistical and pulse information against fingerprint templates. The result is one or more identification matches as to the type and timing of a pulse. In addition, the L1 classification engine 230 outputs statistical information that characterizes generally what is occurring in the frequency band. The L1 classification engine 230 configures the SAGE pulse detectors appropriate for signal classification, as described above.

The signal identification information output by the L1 classification engine 230 is also called a "fingerprint identification" and includes for example, a center frequency (if relevant), fingerprint ID, estimated probability that the fingerprint ID represents the device, power of the identified device and estimated duty cycle percentage. The fingerprint ID includes for example, IDs for a microwave oven, frequency hopping device (such as a Bluetooth™ SCO device or a Bluetooth™ ACL device, a cordless phone, an IEEE 802.11 device, and IEEE 802.15.3 device, and various types of radar signals.

The classification statistical information includes histograms built from the pulse events generated by the SAGE signal detector. The L1 classification engine 230 configures the pulse detector to gather the pulse events based on its configuration. Examples of statistical histograms built include center frequency, bandwidth, active transmission, pulse duration, time between pulses and autocorrelation. These histograms and the classification engine are described in further detail in the aforementioned signal classification patent application.

FIG. 15 also shows the various application services and how they interface with the manager services. The L2 measurement manager 320 exchanges data with the spectrum analyzer application 410 and with the measurement/stats application 430. The L2 measurement manager 320 receives SUM data from the L1 measurement engine 220 and builds the complete SUM, called the L2 SUM 380. The L2 SUM 380 includes radio and protocol statistics. The L2 SUM 280 will be described in greater detail in conjunction with FIG. 20. The L2 location manager 310 interfaces information with the location application 420. For example, the L2 location manager 310 supplies raw location data the location application 420 processes to generate location information for various devices operating in the frequency band. The L2 classification manager 330 exchanges information with a classification definition application 425. The classification definition application 425 is an application that generates and supplies new or updated signal definition reference data (also called fingerprints) for use by the classification engine 230. A classification definition algorithm is disclosed in the aforementioned commonly assigned application related to signal classification. The L2 policy manager 340 exchanges information with the policy application 440. One function of the policy application 400 is to define and supply spectrum policies governing use of the frequency band in certain situations. A policy wizard, described hereinafter, is an example of another function of the policy application 440.

Figure 16:
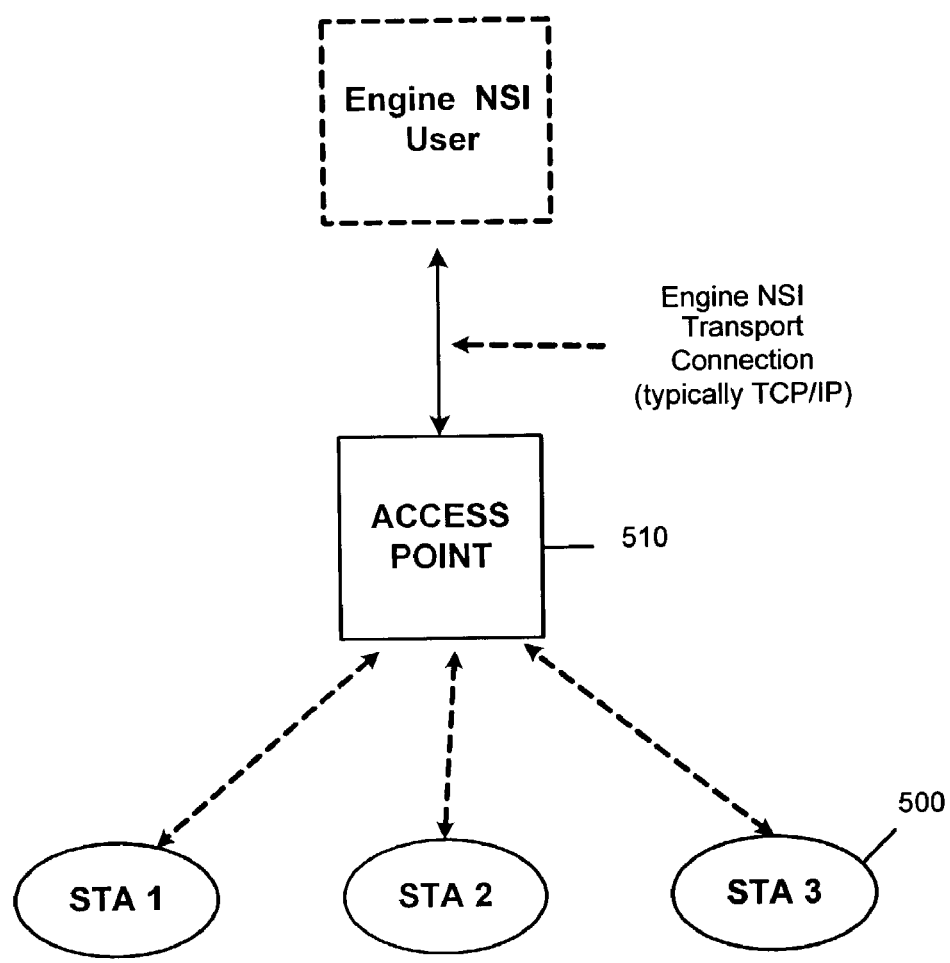
FIGS. 16-19 are diagrams showing several interactions of the engine NSI with devices in a WLAN environment.

Turning to FIGS. 16-19, the interface between the L1 engines services and the L2 manager services will be described. The function of the Engine NSI is to provide access to the L1 engines services. As shown in FIG. 16, in a WLAN application, the L1 engine services operate within APs and Client STAs. A single instance of the Engine NSI provides access to either an AP and the STAs, or a single STA. Instances of the Engine NSI are distinguished by transport connections. That is, there a separate transport connection for each instance of the Engine NSI. In a WLAN application, the Engine NSI may be provided within both APs and STAs. Similar L1 services are provided in both the STAs and the controlling APs. For example, the output of the SAGE is provided to both APs and STAs. Similarly, network SUM/Stats are available from both the AP's and STA's perspective.

Figure 17:
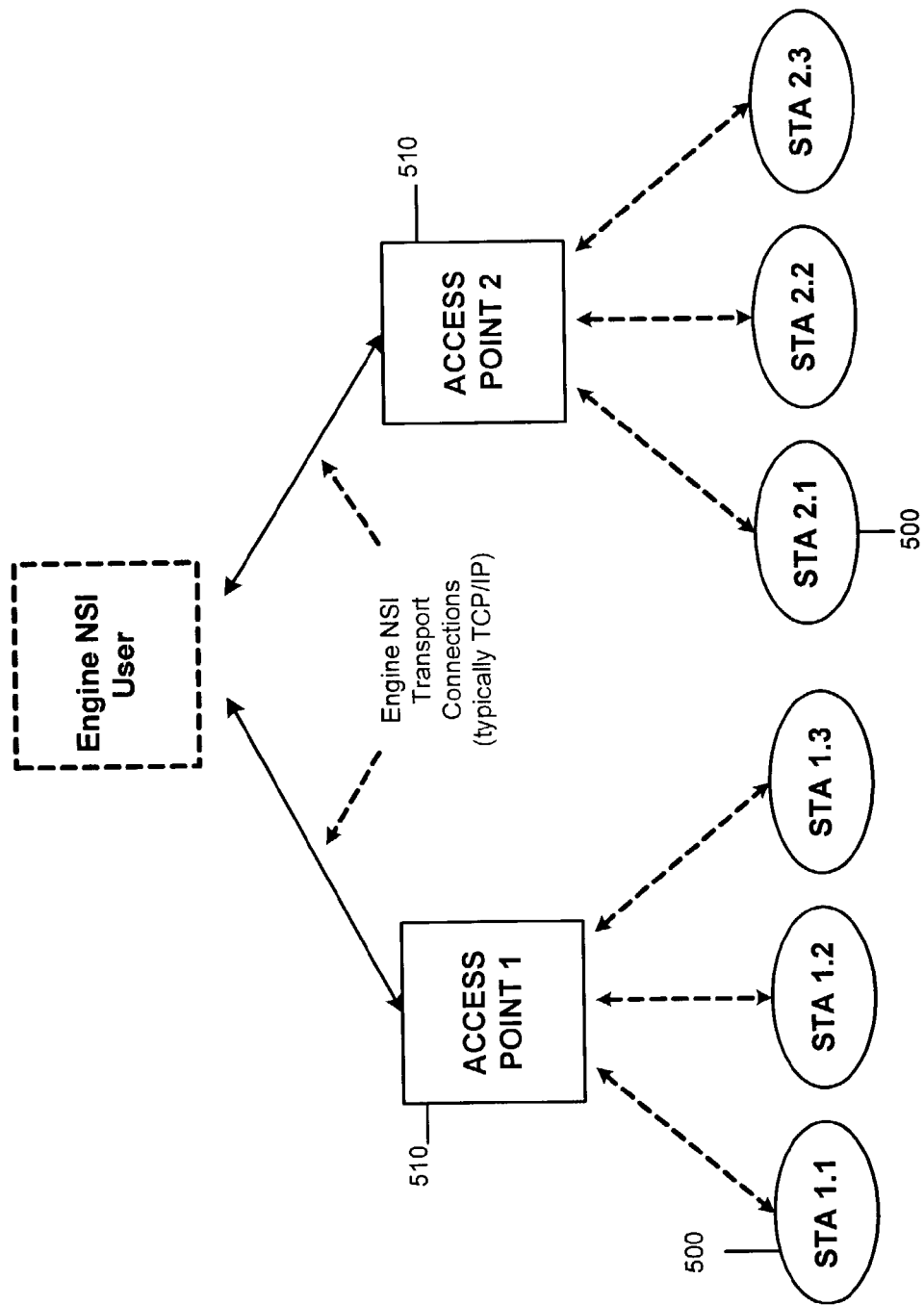

With reference to FIG. 16, when an Engine NSI user wishes to access more than one AP, separate instances of the Engine NSI are created. Each instance is distinguished by a separate transport connection. FIG. 17 shows an example of a single Engine NSI user accessing two APs via two separate instances of the Engine NSI, each with its own transport connection.

Figure 18:
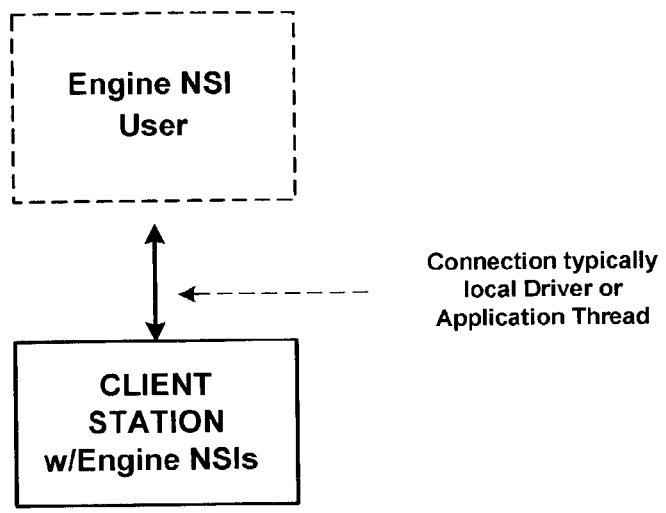
Figure 19:
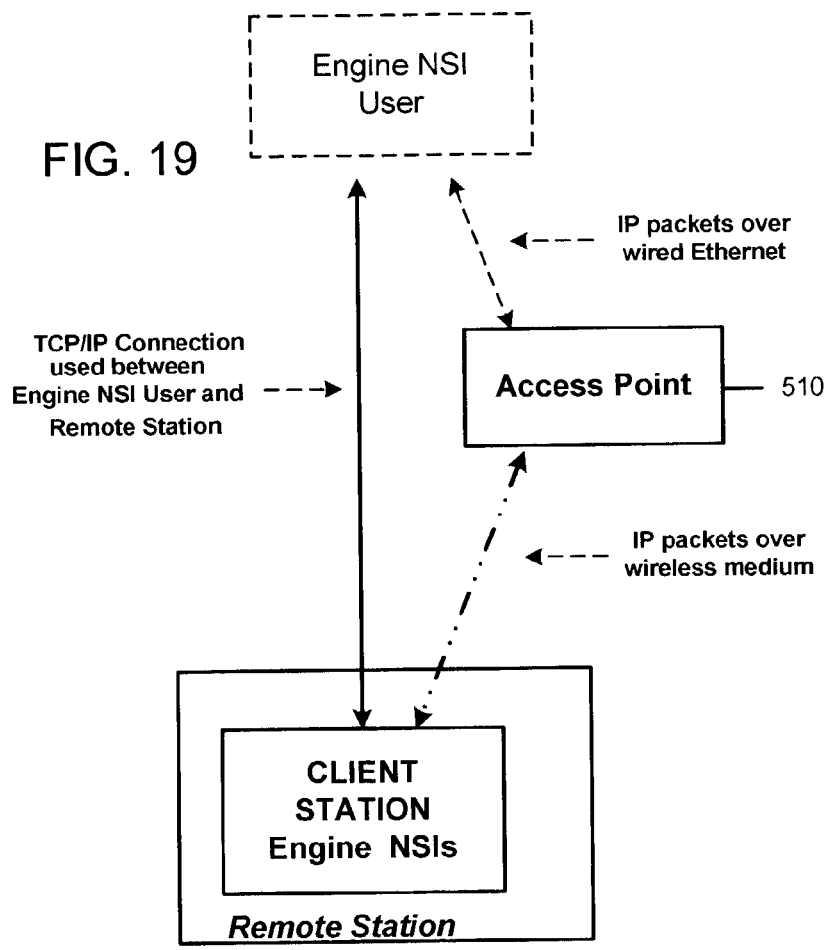
Figure 21:
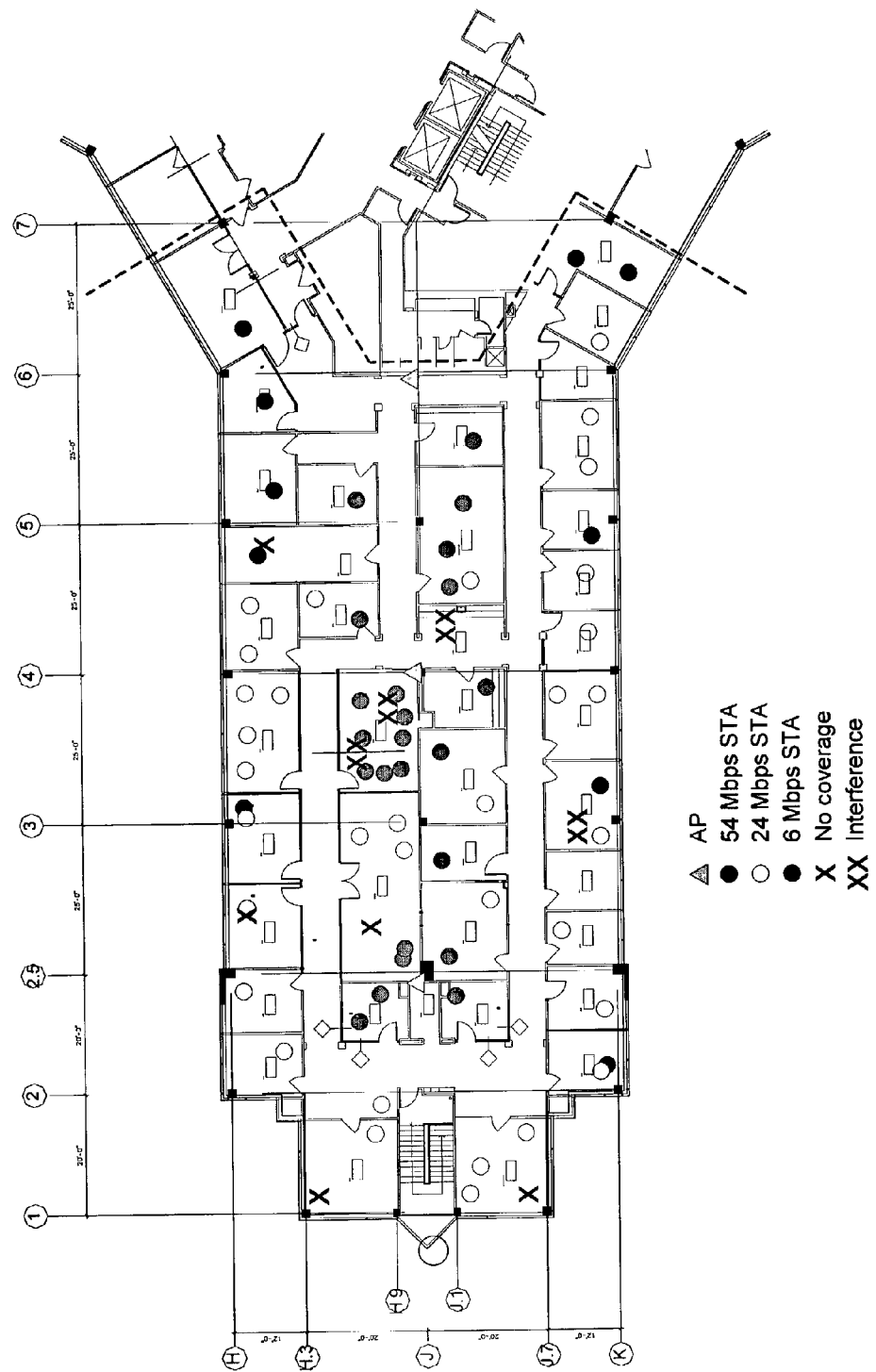
FIG. 21 is a diagram of an exemplary coverage map that can be generated on the basis of the spectrum information generated and propagated through the system.

Turning to FIGS. 18 and 19, accessing the NS-Engine Services within a Station can be achieved either locally within the Station or remotely via a transport protocol. FIG. 18 shows local access typical of a local station management application. The STA management application provides the user services, such as SAGE spectrum analyzer or statistics. FIG. 19 shows how a remote model permits central accumulation of remote STA statistics. It also allows coordination of such activities as interference mitigation between AP, STA and interference sources.

FIG. 20 shows an example of the information contained in the L2 SUM 380. Each Fast Fourier Transform (FFT) frequency bin (of a plurality of frequency bins that span the frequency band) has an associated duty cycle statistic, maximum power statistic, average power statistic, and network traffic statistic, if any. FIG. 20 shows only an exemplary sub-set of the frequency bins.

The L2 Policy Manager

The policy manager 340 defines how to react to the presence of other signals in the frequency band. These policies may be dictated by regulatory domains, or by users/administrators. For example, the European FCC has a mandate to move a channel if a radar signal detected. Alternatively, an administrator may desire to add channel with least noise if the traffic load is above 60%. A user may desire to prioritize cordless phone traffic over WLAN traffic.

These policies will change over time, and vary by use case. This makes it impossible to hard code all cases and ship with a product. New or updated policies created (for example, as explained hereinafter) may be downloaded by the L2 policy manager 340 to the L1 policy engine 240. Management policies may be expressed in the form of a well-defined grammar. These grammar rules define concepts, such as RSSI level, CCA percentage, traffic types (voice, data, video, etc.), protocol type, active channel, alternate channel, etc. Grammar defines operators, such as "greater than," "max" and "member of."

Grammar allows construction of a prioritized set of if/then rules, in the form of:
If [condition] then [activation rule]

The activation rules make use of the underlying spectrum management tools, such as DFS, TPC, etc.

Examples of spectrum policy statements are:

SOHO AP:
  if startup
  active-channel=random from lowest RSSI(AP)
  if active-channel packet errors>20
  active-channel=random from lowest RSSI(AP, STA)

SOHO NIC:
  if startup
  active-channel=find BSSID (1234) start with last-active-channel LARGE WLAN AP:
  if startup
  Active-channel=fixed 7
  if active-channel traffic utilization>60%
  add-channel 8 if measure(channel 8)=low noise LARGE WLAN NIC:
  if startup
  active-channel=find highest SNR with low CCA
  if active-channel collisions>50%
  find alternate channel with low CCA The policy manager 340 matches the spectrum policy rules against current conditions, and takes action, acting essentially like a rule-based expert system "inference engine." The matching intelligence of the policy manager 340 may use toolkits from the field of artificial intelligence: lisp, prolog, etc. In addition, the policy manager 340 may use fuzzy logic to deal with fuzzy terms such as "high traffic", "bad signal strength," etc. Additional policies for bandwidth allocation are disclosed in U.S. Provisional Application No. 60/330,935, filed Nov. 2, 2001, entitled "Dynamic Network Bandwidth Allocation in a Wireless LAN."

A policy wizard is an example of a policy application 440. It supplies information to the policy manager 340 and simplifies the task of creating spectrum policies by asking the user (or administrator) a set of questions, such as:
  Is this a home network or an office network?
  Is there more than one AP in the network?
  Is there one or more cordless phones in the area?

Based on this information, the policy wizard generates spectrum policies appropriate for those parameters. The spectrum policies are downloaded to the policy manager 340.

The location application 420 is used, when needed, to determine the location of devices operating in the band. The output of the location manager 310 is coupled to a presentation application in the application software level 400. Further details of techniques for determining the location of devices in a WLAN are disclosed in U.S. Provisional Application No. 60/370,725, filed Apr. 9, 2002, and entitled "Systems and Methods for Performing Location Measurements Using a Wideband Radio Device."

Spectrum Management Exemplary Scenarios
  Scenario 1: Network Monitoring
  Reporting is both the simplest and most powerful application of spectrum management. In this example, reporting is used to help in troubleshooting the presence of a "rogue" or undesired noise source.

Ex. 1: Corporate WLAN Environment

Measurement: Each AP makes measurements of its environment. If an AP detects an unexpected noise signal, it forwards spectrum and sample data to the WLAN management server.

Classification: At the server, the signal is classified based on known fingerprints. The location of the signal source is pinpointed by triangulating the spectrum data from multiple APs (and STAs).

Policy: The management server issues an alert to the WLAN administrator. "Interferer detected, identified as Panasonic cordless phone in room 400."

Policy: The server emails a complete report to the administrator including spectrum analysis graphs, and graphical location information.

Ex. 2: Home WLAN Environment

Measurement, Classification: Similar to above, but in this case the AP and STAs are used for measurements, and classification software runs on the PC/STA.

Policy: User is notified via simple language messages on their PC, but a reaction should be automatic. "A cordless phone is creating interference, hit OK to invoke the noise solution wizard." The "noise solution wizard" may be a spectrum action that will remove the effects of the noise on the device, such as by moving to another channel, etc.

FIG. 20 is an example of a coverage map generated on the basis of data gathered in an office environment.

Scenario 2: Secondary Usage

Secondary usage refers to allowing devices to make use of "fallow" licensed spectrum. This is not just a futuristic scenario. It already exists in the case of 802.11a in Europe. At 5 Ghz, radar is considered the primary user, and 802.11a is a secondary user. Current implementations simply quiesce the network and look for RSSI. Simple RSSI measurement and DFS are not enough to enable secondary use. The "pecking order" between primary and secondary users requires a different response to noise depending on whether it is from a primary or another secondary user. By detecting and classifying signals, a differentiation is made between radar and other spectrum users.

In order to be a secondary user, the following occurs:

Measurement: Pause periodically to check for the presence of primary users.

Classification: Distinguish between primary users, and other secondary users.

Policy: Determines how long and how often to measure, and how to respond when a primary user is detected.

Scenario 3: High QoS in the Presence of an Interfering Signal or Noise

An 802.11a network carries a video stream. Background noise is causing a problem with packet loss. Assume that the AP in the network has multi-channel capability.

Figure 22:
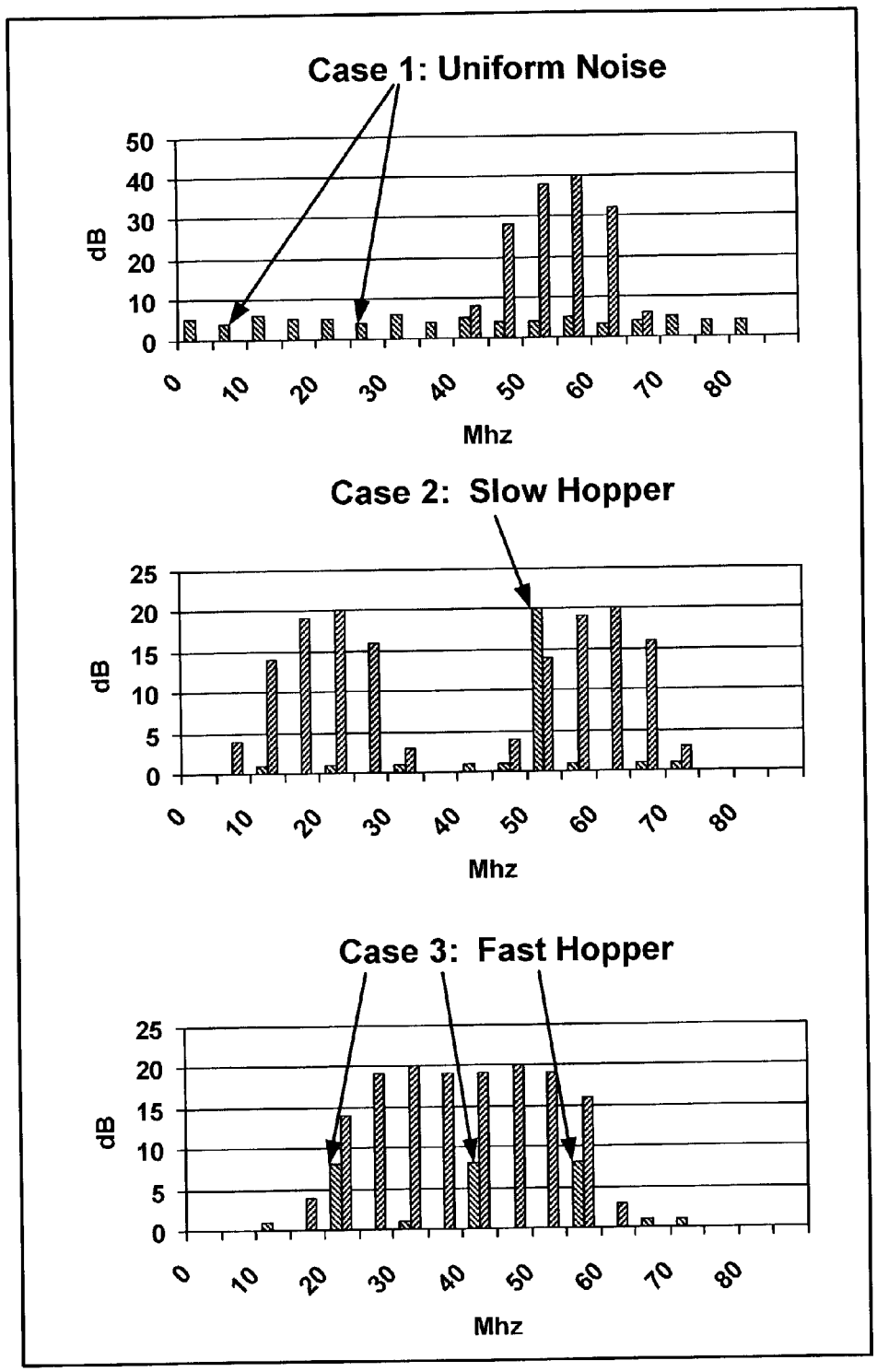
FIG. 22 is a diagram showing exemplary signal activity that may be simultaneously occurring in the frequency band.

The best solution is achieved by measuring and classifying the noise, and using a different policy depending on the interfering signal. With reference to FIG. 22, a first case is shown (Case 1), where the noise is background hum, uniform in time. The policy associated with this case may be to use a spatial processing algorithm to improve the link margin between two devices. Examples of spatial processing algorithm are disclosed in commonly assigned and co-pending U.S. application Ser. Nos. 10/174,728 filed Jun. 19, 2002, entitled "System and Method for Antenna Diversity Using Joint Maximal Ratio Combining;" 10/174,689 filed Jun. 19, 2002, entitled "System and Method for Antenna Diversity Using Equal Gain Joint Maximal Ratio Combining;" and 10/064,482, filed Jul. 18, 2002, entitled "System and Method for Joint Maximal Ratio Combining Using Time-Domain Signal Processing."

In Case 2, the interference is caused by a slow frequency hopping signal. The policy associated with this case would be to use redundant channels to reduce packet error rate.

In Case 3, the interference is caused by a fast frequency hopping signal. The policy associated with this case would be to use a rate ½ code across a wider bandwidth channel to reduce packet error rate.

Scenario 4: Finding a Channel in a Dense Environment

In a sparsely-used environment, it may suffice to simply search for a channel with no interference. This is the easy case.

But in a densely-used environment, a device could easily find that no channel is available with zero interference.

In this case, one approach might be to accept a channel with the "lowest" interference. If a new network must compete with another spectrum user, the optimal channel selection algorithm should consider, for example:

What are the priorities of the various networks?

Which networks might the new network function cooperatively with?

For example, the IEEE 802.11 specification is designed such that two 802.11 networks can share a channel reasonably, whereby each network gets allocated a part of the bandwidth. Making this kind of decision in the most optimal way requires measurement, classification and policy capabilities.

Scenario 5: 802.11 in the Presence of Bluetooth

A Bluetooth™ signal is a frequency hopping signal. It therefore can cause periodic interference with, for example, an IEEE 802.11 network that uses a fixed channel. In order to work cooperatively with Bluetooth™, an IEEE 802.11 network should perform measurement and classification to determine the presence of the Bluetooth™ network.

Once Bluetooth is detected, several policies may be invoked:

Policy 1a: If Bluetooth is using synchronous (SCO) traffic, schedule any 802.11 QoS packets so that they occur between the timing of the SCO packets.

Policy 1b: If Bluetooth is using SCO traffic, do not transmit during the SCO periods.

Policy 2: Attempt to minimize the effect of receive interference from Bluetooth by adjusting a steerable antenna.

Policy 3: Do not shift to a lower data rate in response to packet errors. This may only exacerbate the problem.

Scenario 6: Bluetooth in the Presence of 802.11

In order to work cooperatively with 802.11, a Bluetooth network should perform measurement and classification to determine the presence of 802.11 networks. Once an 802.11 network has been detected, a policy can be invoked:

Policy 1: No Adaptive Hop Sets Supported for a Bluetooth™ Network

In this case, the Bluetooth network should avoid generating interference with 802.11 by idling slots where the 802.11 data or ACK would occur. An example of this technique is disclosed in U.S. Patent Publication No. 20020061031. The Bluetooth™ network will only want to use this algorithm when a "real" data network is present, as opposed to just a noise source. This drives the need for classification over simple RSSI measurements.

Policy 2: Adaptive Hop Sets Supported for a Bluetooth™ Network

In this case, the Bluetooth network should remove hops that enter the 802.11 band. One known proposal in 802.15.2 suggests using lost packets to identify the presence of a foreign network. This is not always effective. Interference is not always symmetric (i.e., the Bluetooth network may be causing a problem with another network, but the other network is not interfering with the Bluetooth network). In addition, this would require losing packets before another network is detected.

Scenario 7: DRA in the Presence of a Frequency Hopping Signal

A Dynamic Rate Adapting (DRA) device uses more spectrum when it is available, and less when it is not available. For example, the increased spectrum may be used for higher data rate, QoS, etc. DRA can be implemented as a new protocol (e.g., "bed-of-nails" orthogonal frequency division multiplex systems), or by aggregating multiple standard channels.

The question arises, however, as to how should DRA deal with frequency hopping protocols. One solution is that in order to deal politely with a frequency hopping signal, a DRA device must detect the hopper via measurement and classification. Once the hopper has been classified, then policies can be invoked. Exemplary situations are as follows:

Policy 1: If a frequency hopping signal is detected, limit the DRA to 50% of the band, so that the frequency hopping network can still operate.

Policy 2: If the frequency hopping network adapts its hop set in response (observed by a measurement), then DRA can be allowed to use 75% of the band.

Scenario 8: Device Specific Policies

In a personal environment, users may want to define priorities among specific devices. For example, at home, users may want to establish a "pecking order" between cordless phone, streaming video, WLAN, etc. In order to allow for policies at the specific device level, it will be necessary for devices to measure and classify other operating devices. Devices can be taught to recognize each other, by directly exchanging classification information, or by using "training" modes similar to universal remote controls. Unrecognized devices may be handled with various policies:

In an office environment, report immediately.

In a home environment, treat the situation as a low priority.

Scenario 9: Context Specific Policies

Some policies will be dependent on context information such as location, time of day, etc.

These policies need to be updateable, since they are heavily dependent on the desires of the user.

Network Selection:

In a home environment, always use a particular basic service station identifier, e.g., BSSID 7.

In an office environment, use the lowest CCA between BSSID 23, 27.

In a public access environment (e.g., an airport), use the BSSID that offers the lowest per-minute access charge.

Traffic Prioritization:

During morning hours, prioritize WLAN download traffic.

During evening hours, prioritize video streaming data.

A policy wizard can be used to allow unsophisticated users to create complex policies.

Scenario 10: Regulatory Specific Policies

In order to follow the regulatory requirements of various countries, different policies may be required.

These policies should be downloadable, since there will be a lot of them, and they will change over time.

The ECC may impose uniform spreading requirement on channel selection algorithms for 802.11a. There may be different transmit power, band and channel requirements by country.

The foregoing scenarios illustrate the advantage of gathering intelligence about use of the spectrum and using that information. Smart data rate selection is another example of how an intelligent system has advantages over current systems, in which there is no direct information about interference, for example. Without knowledge about interference, it is difficult to distinguish between problems caused by interference, packet errors or hidden nodes. As a result, current systems implement "best-guess" algorithms that are often counter-productive. An example is an 802.11b response to the presence of a frequency hopping signal, such as a Bluetooth™ SCO. The initial 802.11b response is to back-off on the data rate, which in turn causes more collisions, which 802.11b responds to with further rate back-off, etc. By contrast, the system described above uses signal classification and other interference timing information to make intelligent decisions on data rate.

Furthermore, current systems use static pre-defined packet fragmentation levels, and also have no information about the timing of an interfering signal. The intelligent spectrum management system allows for the optimization of fragmentation levels and packet scheduling in response to interference patterns. By synchronizing with periodic signals (using the USS of the SAGE), packets are scheduled to avoid periods of interference. In addition, packets are dynamically fragmented to fit before the next interference period.

Spectrum measurement data is also useful to optimize other functions of an 802.11b network, such as channel scanning, channel selection/load balancing, as described above.

Spectrum Management Using a PC Card Type Device

Figure 23:
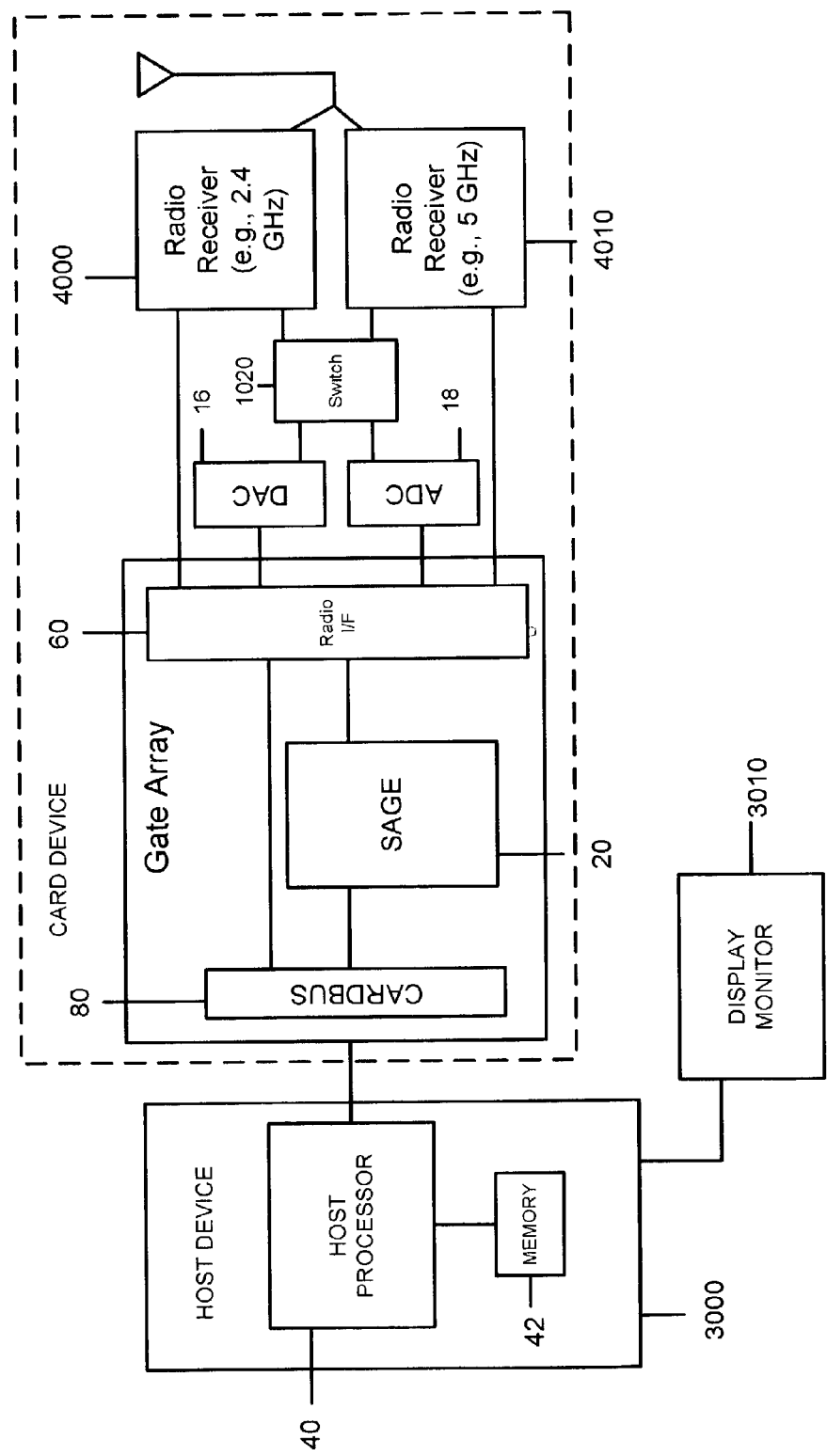
FIG. 23 is a block diagram of a card device that can be used as part of another type of spectrum management system deployment.

FIG. 23 illustrates another way of deploying the spectrum management system. The SAGE 20 or other device capable of generating signal pulse data is deployed together with the radio I/F 60 and an interface, such as a cardbus interface 80. Other interfaces are also suitable. These components may be implemented in a field programmable gate array together with the cardbus interface 80. The cardbus interface 80 may interface with various card-slot types, such as Type II PC-Card slot. The SAGE 20 is used by a host device 3000 that has a host processor 40 as well as other components. A display monitor 3010 may be coupled to the host device 3000. The host device 3000 may be, for example, an access point for a wireless local area network, in which case it would have the requisite radio transceiver and baseband signal processing components. Alternatively, the host device 3000 may be a desktop or notebook personal computer or personal digital assistant. A memory 42 in the host device may store the software programs that correspond to the aforementioned embedded software and the hosted software. In addition, the memory 42 may store driver software for the host device, such as drivers for operating systems such as Windows operating systems (Windows® XP, Windows® CE, etc.).

One or more radio receivers may be coupled to the radio I/F 300. For example, one radio receiver 4000 may be dedicated to one frequency band (such as the 2.4 GHz unlicensed band) and another radio receiver 4010 may be dedicated to another frequency band (such as the 5 GHz unlicensed bands). A switch 4020 selects the baseband analog output from one of the radio receivers, and couples it to an ADC 18, which is in turn coupled to the radio I/F 60. The DAC 16 is used to couple control signals to the radio receivers to, for example, control the bandwidth of operation of the radio receiver for wideband or narrowband operation. Alternatively, a radio transceiver may be provided instead of one or two radio receivers. The dotted block around the elements in FIG. 23 is meant to represent that these components may reside in a card device, such as a PC-card that interfaces with the host device 1000.

Figure 24:
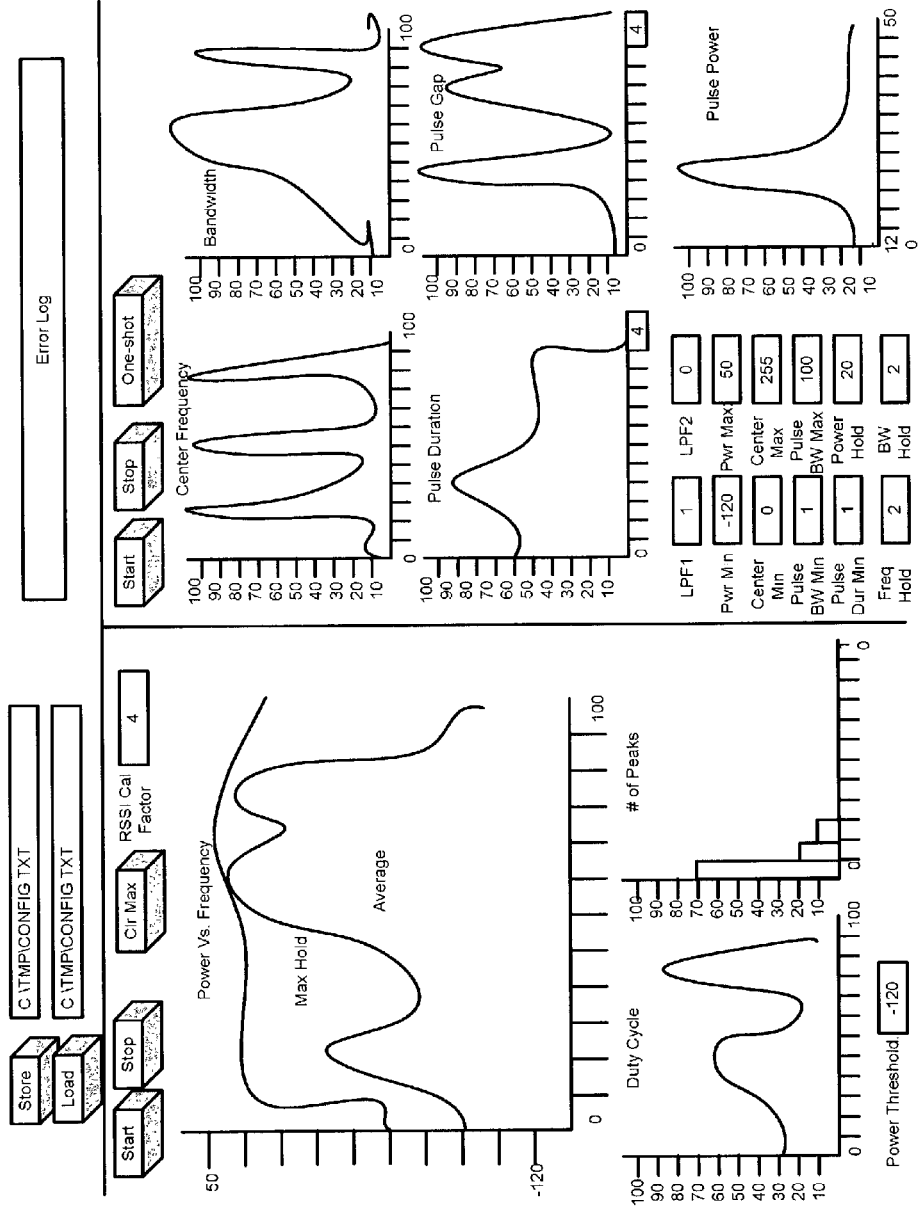
FIG. 24 is a graphical diagram showing exemplary output that may be generated by the system shown in FIG. 23.

The host processor 40 performs the functions to control, and interface with, the SAGE 20, as well as other functions, such as executing all of the L1 engine services and L2 manager services layers shown in FIG. 5. In addition, another application program residing in the memory 42 of the host device 3000, such as the spectrum analyzer application 410, may generate a graphic user interface display of the SAGE and/or other features as shown in FIG. 24. In addition, there may controls to trigger display of newly captured data as shown by the buttons at the top of FIG. 24.

Still another variation is to implement the functions of the SAGE 20 in software on the host processor 40, together with the L1 engine services and the other software layers of the spectrum management architecture. In this way, the output of the ADC of any one or more device(s) operating in the frequency band (particularly those devices having a wideband capable radio receiver) can be supplied to a host processor where the spectrum management functions described above are performed entirely in software, such as signal classification, policy management, etc.

In sum, a method is provided for managing usage of a radio frequency band that is shared by multiple devices, comprising steps of monitoring activity in the frequency band at a device operating in the frequency band to generate spectrum activity information for the frequency band; processing the spectrum activity information received from the device to generate spectrum management information; and controlling usage of the frequency band by one or more devices operating in the frequency band using the spectrum management information. This method may be implemented a processor that executes instructions stored/encoded on a processor readable medium, that when executed by the processor, cause the processor to perform those steps.

In addition, a method is provided in a device that operates in a radio frequency band that is shared by multiple devices comprising steps of monitoring activity in the frequency band; classifying signals detected in the frequency band from the information representing activity in the frequency band; and controlling operation of the device based on the type of signals occurring in the frequency band according to spectrum policies.

Further still, a system for managing spectrum usage by one or more devices in a radio frequency band, comprising a radio receiver capable of receiving energy across substantially the entire radio frequency band; a spectrum analysis device coupled to the radio receiver that generates information describing activity in the frequency band based on signals output by the radio receiver; and a processor coupled to the spectrum analysis device that processes the information output by the spectrum analysis device to classify signals detected in the radio frequency band.

In addition, in the context of spectrum policies, a method is provided for generating spectrum policies useful to manage use of a frequency band that is shared by multiple devices, comprising steps of receiving information generally describing devices operating in a frequency band; generating spectrum policies that define how at least one device is to utilize the frequency band in the presence of the other described devices. This method may be implemented by instructions encoded on a processor readable medium that, when executed by a processor, cause the processor to perform those steps.

Moreover, a system is provided for managing use of a radio frequency band shared by multiple devices, comprising a first device that operates in the radio frequency band and a computing device. The first device comprises a radio receiver capable of receiving energy across substantially the entire radio frequency band; a spectrum analysis device coupled to the radio receiver that generates spectrum activity information describing activity in the frequency band based on signals output by the radio receiver; a first processor coupled to the radio transceiver and the spectrum analysis device that executes a first level of one or more software programs to manage use of the spectrum analysis device and radio transceiver; and a second processor coupled to the first processor that executes a second level of one or more software programs to process spectrum analysis data generated by the spectrum analysis device. The computing device comprises a processor that executes a third level of one or more software programs that exchange information with and manage the second level of one or more software programs. The first device and the second device may be coupled by a wireless link or a wired link.

Similarly, a software system is provided for managing use of a radio frequency band shared by multiple devices, comprising a first level of one or more software programs including a spectrum analysis program that generates spectrum activity information describing activity in the frequency band based on signals output by a radio receiver in a device that operates in the frequency band; a second level of one or more software programs including a software program that accumulates spectrum activity information; a third level of one or more software programs that process the accumulated spectrum activity information; and a fourth level of one or more software programs that manage the third level of software programs.

The foregoing description is intended by way of example only.

What is claimed is:

1. A method for managing usage of a radio frequency band that is shared by multiple devices, comprising:
    a. monitoring activity in the frequency band at a device operating in the frequency band to generate spectrum activity information for the frequency band;
    b. processing the spectrum activity information received from the device to generate spectrum management information, wherein processing comprises by executing one or more spectrum policies to determine what actions, if any, should be taken by one or more devices operating in the frequency band, including one or more of actions selected from the group consisting of: frequency channel assignment, transmission data rate, packet fragment size, packet transmit scheduling to avoid interfering with other signals, and transmit power; and
    c. controlling usage of the frequency band by one or more devices operating in the frequency band using the spectrum management information.

2. The method of claim 1, wherein monitoring comprises sampling substantially all the frequency band using a wideband radio transceiver in the device to obtain activity in the frequency band.

3. The method of claim 2, wherein monitoring activity comprises generating spectral-based and time-based information pertaining to activity in the frequency band.

4. The method of claim 1, wherein processing is performed by a device located remote from the device where activity in the frequency band is monitored.

5. The method of claim 1, wherein controlling comprises generating control signals for controlling one or more operating parameters of devices operating in the frequency band, including: frequency channel assignment, transmission data rate, packet fragment size, packet transmit scheduling to avoid interfering with other signals, and transmit power.

6. The method of claim 1, wherein monitoring activity in the frequency band comprises obtaining spectrum analysis information for the frequency band.

7. The method of claim 6, wherein processing information comprises accumulating spectrum analysis information for intervals of time.

8. The method of claim 1, wherein processing spectrum activity information comprises classifying or identifying devices operating in the frequency band.

9. The method of claim 1, wherein executing spectrum policies further comprises fragmenting a packet to be transmitted before a next interference period determined to occur.

10. A method for managing usage of a radio frequency band that is shared by multiple devices, comprising:
  a. monitoring activity in the frequency band at a device operating in the frequency band to generate spectrum activity information for the frequency band;
  b. processing the spectrum activity information received from the device to generate spectrum management information, wherein processing comprises executing one or more spectrum policies to determine what actions, if any, should be taken by one or more devices operating in the frequency band, wherein executing spectrum policies comprises executing a spectrum policy that assigns priority to certain types of signals over others based on the time of day or locations of devices; and
  c. controlling usage of the frequency band by one or more devices operating in the frequency band using the spectrum management information.

11. A method for managing usage of a radio frequency band that is shared by multiple devices, comprising:
  a. monitoring activity in the frequency band at a device operating in the frequency band to generate spectrum activity information for the frequency band;
  b. processing the spectrum activity information received from the device to generate spectrum management information, wherein processing comprises executing one or more spectrum policies to determine what actions, if any, should be taken by one or more devices operating in the frequency band, wherein executing spectrum policies comprises executing a spectrum policy that is based on regulatory specific policies governing the use by devices of the frequency band; and
  c. controlling usage of the frequency band by one or more devices operating in the frequency band using the spectrum management information.

12. A method for managing usage of a radio frequency band that is shared by multiple devices, comprising:
  a. monitoring activity in the frequency band at a device operating in the frequency band to generate spectrum activity information for the frequency band;
  b. processing the spectrum activity information received from the device to generate spectrum management information, wherein processing comprises executing one or more spectrum policies to determine what actions, if any, should be taken by one or more devices operating in the frequency band, wherein executing comprises executing a spectrum policy that assigns a higher level of priority of usage of the frequency band to one or more signals over other signals; and
  c. controlling usage of the frequency band by one or more devices operating in the frequency band using the spectrum management information.

13. The method of claim 12, wherein executing comprises executing a spectrum policy that assigns higher priority to a radar signal in a 5 GHz radio frequency band over other signals in that radio frequency band.

14. A method for managing usage of a radio frequency band that is shared by multiple devices, comprising:
  a. monitoring activity in the frequency band at a device operating in the frequency band to generate spectrum activity information for the frequency band,
  b. processing the spectrum activity information received from the device to generate spectrum management information, wherein processing comprises executing one or more spectrum policies to determine what actions, if any, should be taken by one or more devices operating in the frequency band, wherein executing spectrum policies comprises executing a spectrum policy that maximizes a transmit data rate of a device given presence of any other signals in the frequency band; and
  c. controlling usage of the frequency band by one or more devices operating in the frequency band using the spectrum management information.

15. The method of claim 14, wherein executing the spectrum policy comprises limiting a transmit data rate if there is a frequency hopping signal also occurring in the frequency band.

16. In a device that operates in a radio frequency band that is shared by multiple devices, a method comprising:
  a. monitoring activity in the frequency band;
  b. classifying signals detected in the frequency band from the information representing activity in the frequency band; and
  c. controlling operation of the device based on the type of signals occurring in the frequency band according to spectrum policies;
  d. storing in the device information describing the spectrum policies; and
  e. downloading information describing updated or new spectrum policies to the device from another device for storage in said device.

17. The method of claim 16, wherein monitoring comprises:
  a. receiving energy across substantially the entire radio frequency band; and
  b. generating information from the received energy representing activity in the frequency band.

18. The method of claim 16, and further comprising reporting signal classification information to another device that processes the signal classification information according to spectrum policies.

19. A system for managing spectrum usage by one or more devices in a radio frequency band, comprising:
  a. a radio receiver capable of receiving energy across substantially the entire radio frequency band;
  b. a spectrum analysis device coupled to the radio receiver that generates information describing activity in the frequency band based on signals output by the radio receiver;

c. a processor coupled to the spectrum analysis device that processes the information output by the spectrum analysis device to classify signals detected in the radio frequency band; and d. a memory that stores information related to spectrum policies that govern usage of the frequency band;

e. wherein the processor generates signals to control operation of one or more devices in the frequency based on the signals determined to occur in the frequency band and according to the information stored in the memory related to the spectrum policies.

20. The device of claim 19, and further comprising a memory that stores a database of signal classification reference data, wherein the processor compares information output by the spectrum analysis device with the signal classification data to classify a signal.

21. The system of claim 20, wherein the memory stores updated or new signal classification reference data downloaded from another device.

22. A method for accumulating statistics associated with activity in a radio frequency band shared by a plurality of devices, comprising:

a. detecting activity in the frequency band during time intervals;

b. generating data representing activity during time intervals in the frequency band; and c. accumulating the data over the time intervals to build statistics of activity in each of a plurality of frequency bins in the frequency band, wherein accumulating comprises accumulating for each frequency bin statistics including one or more selected from the group consisting of: signal pulse duty cycle, maximum signal power, average signal power, network type and network traffic conditions and activity.

23. The method of claim 22, wherein receiving data comprises receiving output from a spectrum analyzer in a device that receives signals in the frequency band.

24. The method of claim 22, wherein detecting activity in the frequency band comprises operating a radio receiver in a wideband mode so as to receive energy in substantially the entire frequency band during time intervals.

25. The method of claim 22, wherein accumulating comprises accumulating statistics associated with signal pulses detected in the frequency band, including one or more statistics selected from the group consisting of: number of signal pulses concurrent in the frequency band, signal pulse center frequency, signal pulse bandwidth, signal pulse duration, time between signal pulses and signal pulse power.

26. The method of claim 22, and further comprising displaying the data.

* * * * *